(12) United States Patent
Maiorana

(10) Patent No.: US 12,286,050 B2
(45) Date of Patent: *Apr. 29, 2025

(54) TRAILER WITH INCLUDED REAR BULKHEAD

(71) Applicant: Mac LTT, Inc., Kent, OH (US)

(72) Inventor: James A. Maiorana, Hartville, OH (US)

(73) Assignee: Mac LTT, Inc., Kent, OH (US)

( * ) Notice: Subject to any disclaimer, the term of this patent is extended or adjusted under 35 U.S.C. 154(b) by 632 days.

This patent is subject to a terminal disclaimer.

(21) Appl. No.: 17/586,871

(22) Filed: Jan. 28, 2022

(65) Prior Publication Data

US 2023/0242028 A1    Aug. 3, 2023

(51) Int. Cl.
*B60P 3/22* (2006.01)
*B65D 88/74* (2006.01)

(52) U.S. Cl.
CPC ............ *B60P 3/221* (2013.01); *B65D 88/747* (2013.01)

(58) Field of Classification Search
CPC .......... B60P 7/14; B60P 3/221; B65D 88/747; B61D 45/006
See application file for complete search history.

(56) References Cited

U.S. PATENT DOCUMENTS

| | | |
|---|---|---|
| 2,033,457 A | 3/1936 | Davis, Jr. |
| 2,340,628 A | 2/1944 | Theriault |
| 3,187,425 A | 6/1965 | Black |
| 3,796,457 A | 3/1974 | Hinchliff |
| 4,538,632 A | 9/1985 | Vogl |
| 4,627,629 A | 12/1986 | O'Neill |
| 4,861,088 A * | 8/1989 | Fedrigo ................. B62D 35/00 296/180.1 |
| 4,975,205 A * | 12/1990 | Sloan ..................... E03F 7/103 210/519 |
| 5,333,554 A | 8/1994 | Yamada et al. |
| D353,437 S | 12/1994 | Getty et al. |
| 5,911,337 A | 6/1999 | Bedeker |
| 6,206,623 B1 * | 3/2001 | Podd ................... B65D 90/046 410/129 |
| D473,494 S | 4/2003 | Lieberman |

(Continued)

OTHER PUBLICATIONS

Tanker Truck Driver Shortage, May 20, 2021, The Trucker Web Page [online], [Site Visit May 31, 2024], URL: https://www.thetrucker.com/trucking-news/the-nation/tanker-truck-driver-shortage-combined-with-pipeline-disruption-could-continue-to-impact-gas-prices (Year: 2021).

(Continued)

*Primary Examiner* — Anne Marie M Boehler
*Assistant Examiner* — Hosam Shabara
(74) *Attorney, Agent, or Firm* — Sand, Sebolt & Wernow Co., LPA

(57) ABSTRACT

A trailer that has a main body having a front bulkhead, an opposing rear bulkhead, an exterior wall operably engaged with the front and rear bulkheads, and at least one interior chamber defined collectively by the front bulkhead, the rear bulkhead, and the exterior wall. The at least one interior chamber is adapted to carry a load. The trailer also includes a removable false bulkhead operably engaged with the main body. The false bulkhead is located a distance away from one of the front bulkhead and the rear bulkhead.

22 Claims, 14 Drawing Sheets

(56) References Cited

U.S. PATENT DOCUMENTS

| | | | |
|---|---|---|---|
| 6,981,828 B2 * | 1/2006 | Davies | B60P 7/135 |
| | | | 410/144 |
| 7,293,802 B2 * | 11/2007 | Bachman | B60P 3/228 |
| | | | 137/185 |
| 7,300,073 B2 | 11/2007 | Bachman | |
| 7,475,910 B1 * | 1/2009 | Calonge | B60P 3/2235 |
| | | | 280/830 |
| 7,731,462 B2 * | 6/2010 | Squyres | B60P 7/15 |
| | | | 410/129 |
| 7,975,622 B2 | 7/2011 | Dalrymple et al. | |
| 8,162,164 B2 | 4/2012 | Podd et al. | |
| D668,582 S | 10/2012 | Doron | |
| 8,770,657 B2 | 7/2014 | Shirai | |
| D720,655 S | 1/2015 | Maiorana et al. | |
| 9,073,579 B1 | 7/2015 | Joyce et al. | |
| 9,211,835 B2 * | 12/2015 | Knox | B60P 7/14 |
| 9,387,788 B1 * | 7/2016 | Stroup | B60P 1/28 |
| 9,789,916 B1 | 10/2017 | Beelman, III et al. | |
| 9,809,142 B1 * | 11/2017 | White | B62D 33/0273 |
| 9,815,402 B1 * | 11/2017 | Salter | F21V 9/30 |
| D869,990 S | 12/2019 | Maiorana et al. | |
| D873,719 S | 1/2020 | Maiorana | |
| D915,945 S | 4/2021 | Kloepfer et al. | |
| 11,396,420 B2 * | 7/2022 | Hayes | B60P 3/2235 |
| 11,505,256 B2 | 11/2022 | Gangula | |
| 11,718,330 B2 | 8/2023 | Hartmann et al. | |
| 11,780,508 B1 * | 10/2023 | Maiorana | B62D 33/04 |
| | | | 296/182.1 |
| 2005/0092043 A1 | 5/2005 | Tremblay | |
| 2007/0125259 A1 | 6/2007 | Dalrymple | |
| 2009/0085394 A1 | 4/2009 | Lemmons | |
| 2010/0065685 A1 | 3/2010 | Basso | |
| 2013/0200657 A1 | 8/2013 | Shirai | |
| 2014/0091564 A1 | 4/2014 | Brown | |
| 2017/0096092 A1 | 4/2017 | Cannon et al. | |
| 2018/0354409 A1 | 12/2018 | Maiorana | |
| 2021/0323422 A1 | 10/2021 | Maiorana | |
| 2021/0323464 A1 | 10/2021 | Maiorana | |
| 2021/0323493 A1 | 10/2021 | Maiorana | |
| 2022/0204058 A1 | 6/2022 | Hartman et al. | |
| 2022/0258807 A1 | 8/2022 | Gangula | |
| 2023/0242029 A1 | 8/2023 | Maiorana | |
| 2023/0242181 A1 | 8/2023 | Maiorana | |
| 2023/0294777 A1 | 9/2023 | Maiorana | |
| 2023/0322155 A1 | 10/2023 | Maiorana et al. | |

OTHER PUBLICATIONS

2023 Heil 9200x4 Petroleum Trailer, Werts Welding Web Pager [online], [Site Visit May 31, 2024], URL: https://www.wertswelding.com/products/heil-cardinal/ (Year: 2023).

2024 Mac 9200x5 w/ TALK, Werts Welding Web Pager [online], [Site Visit May 31, 2024], URL: https://www.wertswelding.com/products/22m9200-5tlk/ (Year: 2024).

MAC LLT Truck Mount Tank, MAC LLT Web Pager [online], [Site Visit May 31, 2024], URL: https://macltt.com/hot-combination-trains.html (Year: 2024).

* cited by examiner

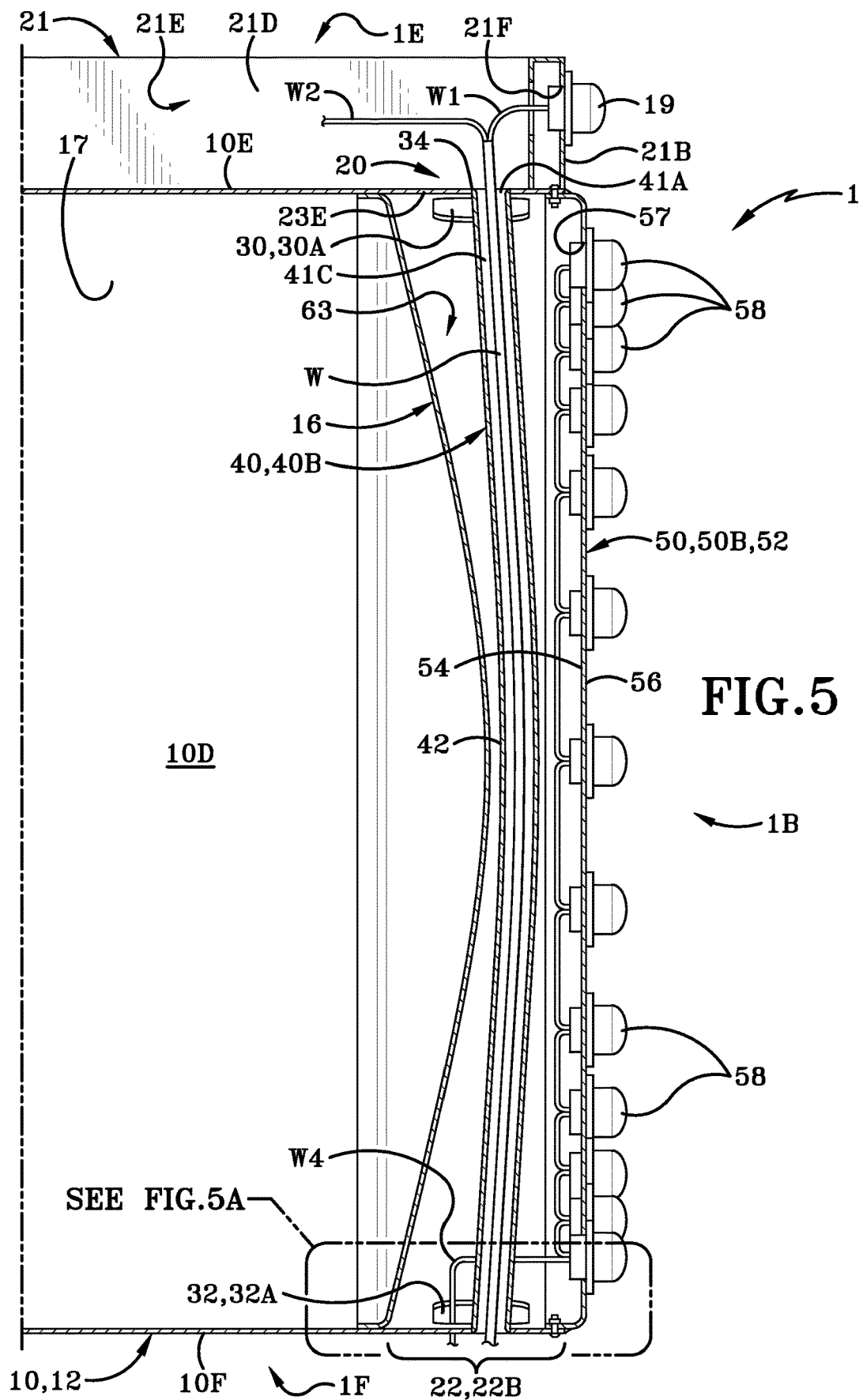

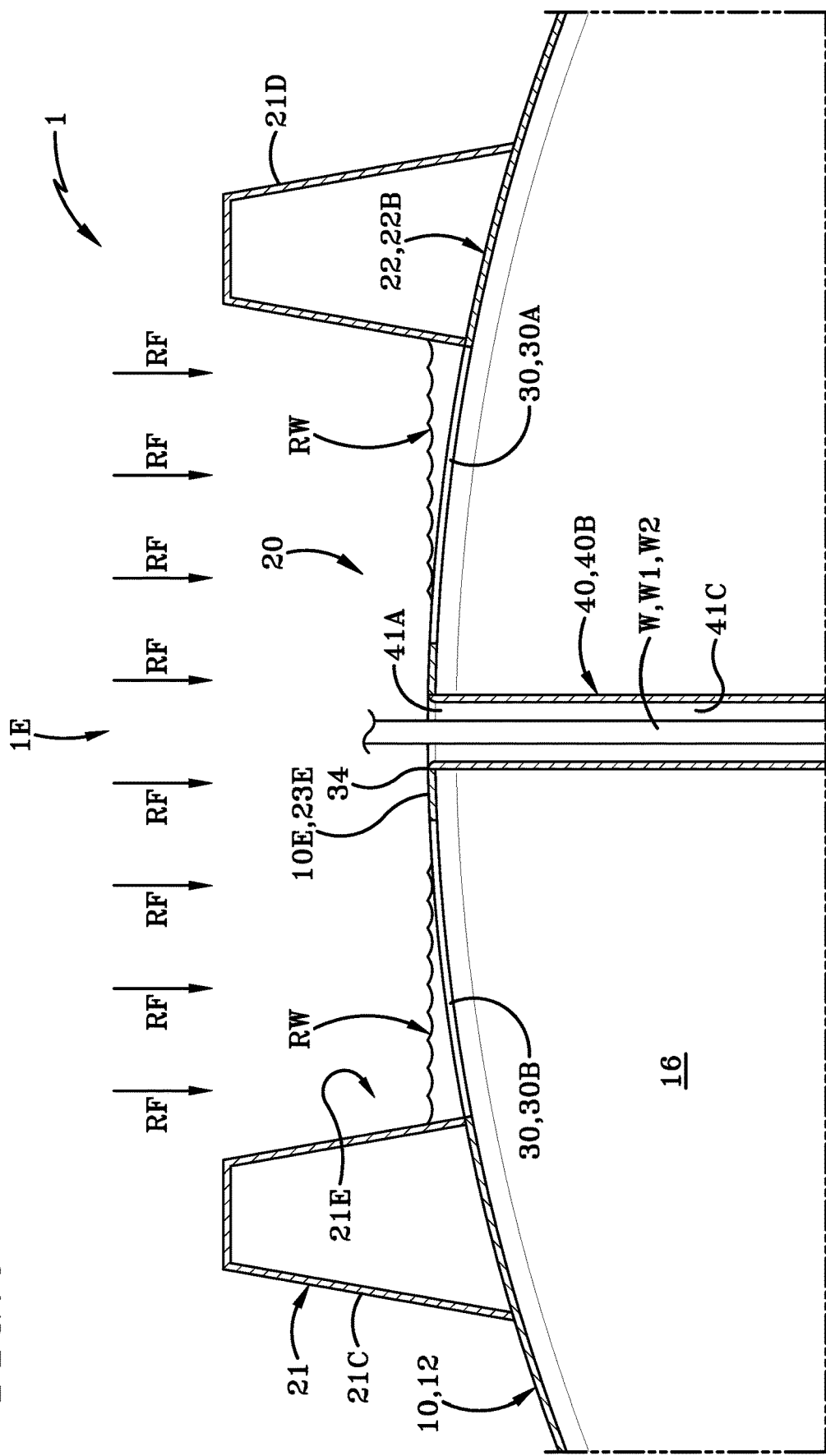

TRAILER WITH INCLUDED REAR BULKHEAD

TECHNICAL FIELD

The present disclosure is directed to tank trailers. More particularly, the present disclosure is directed to exterior assemblies for a trailer. Specifically, the present disclosure is directed to an exterior drainage system for a trailer to prevent unwanted stains or blemishes caused by precipitation on the trailer.

BACKGROUND

Tank trailers and other similar enclosed trailers experience different types of weather and precipitation depending on the climate and region in which the tank trailers are operated. Frequently, a trough or a similar structure is provided on a top portion of these trailers for various purposes based on the type of tank trailer. The trough or similar structure tends to accumulate rainwater or other types of precipitation therein. Accumulation of rainwater and other precipitation inside of such troughs may add unnecessary weight to the tank trailer. This unnecessary weight effectively displaces weight of some of the load the trailer could be carrying, thereby reducing the cost effectiveness of the trailer. The accumulated precipitation may also ultimately corrode part of the tank structure, thereby shortening the life of the trailer.

During operation of the tank trailer, precipitation accumulated in the trough or other structure may spill out of the trough and onto the exterior surface of the trailer. Over time, such spillage may cause unwanted stains or grime to build up on the trailer body giving the trailer an aesthetically displeasing appearance. Furthermore, these unwanted stains may leave the impression that the trailer's load is leaking from the tank. Since many tank trailers carry hazardous loads, the impression that hazardous materials are leaking from the tank may cause unnecessary concern to members of the public.

To combat this issue of spillage and staining of the trailer body, drain tubes have been proposed in the prior art to reduce the accumulation of precipitation in tank trailer troughs. The proposed drain tubes are routed internally through the load-carrying interior compartments of the trailer or are wrapped around the exterior skin of the trailer body. The drain tubes are provided to allow accumulated water or liquid precipitation (i.e., melted ice, melted sleet, melted snow, etc.) to drain from the trailer's trough towards the ground surface. However, it is not uncommon for such drain tubes to become obstructed and therefore the drainage of liquid from the troughs is halted or slowed down. For example, a drain tube may become clogged or obstructed by debris or vegetation becoming wedged or trapped inside of the drain tube. In other instances drain tubes may be obstructed by snow or ice. If water is trapped in the drain tubes and the outside temperature drops to a point that the water freezes, that freezing may cause cracking or bursting of the drain tube. If the drain tube is routed through an interior compartment of the tank trailer, such bursting may cause water or debris to contaminate any load carried in the interior compartment.

SUMMARY

The false bulkhead assembly disclosed herein is provided to effectively hide a front bulkhead or a rear bulkhead of a tank trailer. The false bulkhead is provided to hide from public view any staining from the overflow of accumulated precipitation from a trough or other structure on the tank body. The false bulkhead is also provided to drain accumulated precipitation exterior to an interior compartment of a tank body holding load and/or cargo. As such, the false bulkhead assembly disclosed herein addresses some of the inadequacies of previously known assemblies for trailer draining systems and hiding and/or masking overflow of accumulated precipitation on trailers.

In one aspect, an exemplary embodiment of the present disclosure may provide a trailer. The trailer includes a main body that has an exterior wall with a first end and an opposing second end. The trailer also includes a bulkhead that is provided proximate the first end of the main body. The trailer also includes at least one interior chamber defined by the main body and adapted to carry a load. The trailer also includes a drainage system provided on the trailer. The drainage system includes a drainage portion extending outwardly beyond the first end of the exterior wall, said drainage portion being adapted to direct precipitation away from the bulkhead and towards a ground surface over which the trailer travels.

This exemplary embodiment or another exemplary embodiment may further provide that the drainage system further comprises a trough operably engaged with the main body that extends between the first and second ends of the main body, wherein the trough is configured to hold and convey the precipitation from the main body to the drainage portion. This exemplary embodiment or another exemplary embodiment may further provide that the drainage system further comprises at least one upper opening defined in an upper end of the drainage portion proximate to the first end of the main body, wherein the at least one upper opening is in fluid communication with the trough, and wherein the at least one upper opening is configured to drain the precipitation from the trough through the main body exterior to the interior chamber of the main body. This exemplary embodiment or another exemplary embodiment may further provide that the drainage system further comprises at least one opposing lower opening defined in a lower end of the drainage portion proximate to the first end of the trailer, wherein the at least one lower opening is configured to drain the precipitation from the upper end of the drainage portion downwardly to the lower end of the drainage portion exterior to the interior chamber of the main body. This exemplary embodiment or another exemplary embodiment may further provide that the drainage system further comprises a removable false bulkhead operably engaged with the drainage portion, wherein the false bulkhead is independent from the bulkhead of the main body. This exemplary embodiment or another exemplary embodiment may further comprise a first material that makes the main body; and a second material that makes the removable false bulkhead, wherein the second material is different than the first material. This exemplary embodiment or another exemplary embodiment may further provide that the main body is made of aluminum; and wherein the removable false bulkhead is made of stainless steel. This exemplary embodiment or another exemplary embodiment may further provide that the main body is made of aluminum; and wherein the removable false bulkhead is made of a fabric material. This exemplary embodiment or another exemplary embodiment may further provide that the false bulkhead further comprises a base plate; and a circumferential lip extending laterally from the base plate towards the drainage portion, wherein the circumferential lip is adapted to be operably engaged with an interior surface of the drainage portion. This exemplary embodiment or another exemplary embodiment may further provide that the drainage system further comprises at least one locking mechanism operably engaging the false bulkhead with the drainage portion, wherein the at least one locking mechanism is adapted to maintain the false bulkhead with the drainage portion. This exemplary embodiment or another exemplary embodiment may further provide that the drainage system further comprises an exterior chamber defined between the bulkhead of the main body and the false bulkhead, wherein the exterior chamber is in fluid communication with external environment via the at least one upper opening and the at least one lower opening, and wherein the exterior chamber is isolated from the interior chamber of the main body. This exemplary embodiment or another exemplary embodiment may further provide that the false bulkhead further comprises a plurality of apertures defined in the false bulkhead, wherein each aperture of the plurality of apertures is adapted to receive and house an associated brake light of a plurality of brake lights to operably engage with the false bulkhead. This exemplary embodiment or another exemplary embodiment may further provide that the drainage system further comprises a plurality of upper openings defined in the upper end of the drainage portion, wherein the plurality of upper openings is in fluid communication with the trough, and wherein the plurality of upper openings is configured to drain the precipitation from the trough through the main body exterior to the interior chamber of the main body. This exemplary embodiment or another exemplary embodiment may further provide that the drainage system further comprises a plurality of opposing lower openings defined in the lower end of the drainage portion, wherein the plurality of lower openings is aligned with the plurality of upper openings, and wherein the plurality of opposing lower openings is configured to drain the precipitation from the upper end of the drainage portion downwardly to the lower end of the drainage portion exterior to the interior chamber of the main body. This exemplary embodiment or another exemplary embodiment may further comprise a conduit operably engaged with the drainage portion; wherein the conduit is adapted to isolate electrical wiring and mechanical lines of the trailer from the precipitation drained by the drainage system inside of the exterior chamber. This exemplary embodiment or another exemplary embodiment may further provide that the drainage system further comprises an upper through-hole defined in the upper end of the drainage portion; and an opposing lower through-hole defined in the lower end of the drainage portion, wherein the lower through-hole is coaxial with the upper through-hole; wherein the upper through-hole and the lower through-hole are configured to house and receive the conduit. This exemplary embodiment or another exemplary embodiment may further provide that the drainage system further comprises at least one top opening defined in an upper end of the drainage portion proximate to the second end of the trailer, wherein the at least one top opening is in fluid communication with the trough, and wherein the at least one top opening is configured to drain the precipitation from the trough through the trailer exterior to the interior chamber of the main body. This exemplary embodiment or another exemplary embodiment may further provide that the drainage system further comprises at least one opposing bottom opening defined in a lower end of the drainage portion proximate to the second end of the trailer, wherein the at least one bottom opening is configured to drain the precipitation from the upper end of the drainage portion downwardly to the lower end of the drainage portion exterior to the interior chamber of the main body. This exemplary embodiment or another exemplary embodiment may further provide that the drainage system further comprises a second removable false bulkhead operably engaged with the drainage portion, wherein the second false bulkhead is independent from an opposing second bulkhead of the main body. This exemplary embodiment or another exemplary embodiment may further provide that the drainage system further comprises a second exterior chamber defined between the second bulkhead of the main body and the second false bulkhead, wherein the second exterior chamber is in fluid communication with external environment via the at least one top opening and the at least one bottom opening, and wherein the second exterior chamber is isolated from the interior chamber of the main body. This exemplary embodiment or another exemplary embodiment may further provide that the drainage system further comprises a bead of epoxy operably engaging the false bulkhead with the drainage portion, wherein the bead of epoxy is adapted to prevent escapement of the precipitation. This exemplary embodiment or another exemplary embodiment may further provide that the drainage portion further comprises a first rail operably engaged with the drainage portion, wherein the first rail is fluid communication with a first slot formed in the trough, and wherein the first rail is adapted to direct the precipitation from the trough, via the first slot, and away from the main body at a distance away the main body; and an opposing second rail operably engaged with the drainage portion, wherein the second rail is fluid communication with a second slot formed in the trough, and wherein the second rail is adapted to direct the precipitation from the trough, via the second slot, and away from the main body at the distance away the main body.

In another aspect, an exemplary embodiment of the present disclosure may provide a trailer. The trailer includes a main body having an exterior wall with a first end and an opposing second end. The trailer includes a bulkhead provided proximate the first end of the main body. The trailer includes at least one interior chamber defined by the main body and adapted to carry a load. The trailer includes a drainage system provided on the trailer. The drainage system includes a drainage portion extending outwardly beyond the first end of the exterior wall, said drainage portion being adapted to direct precipitation away from the bulkhead and towards a ground surface over which the trailer travels. The drainage system includes a trough operably engaged with the main body that extends between the first and second ends of the main body, wherein the trough is configured to hold and convey the precipitation from the main body to the drainage portion. The drainage system includes a removable false bulkhead operably engaged with the drainage portion, wherein the false bulkhead is independent from the bulkhead of the main body.

In yet another aspect, an exemplary embodiment of the present disclosure may provide a trailer. The trailer includes a main body having a front bulkhead, an opposing rear bulkhead, an exterior wall operably engaged with the front and rear bulkheads, and at least one interior chamber defined collectively by the front bulkhead, the rear bulkhead, and the exterior wall, said at least one interior chamber being adapted to carry a load. The trailer includes a removable false bulkhead operably engaged with the main body, said false bulkhead being located a distance away from one of the front bulkhead and the rear bulkhead.

This exemplary embodiment or another exemplary embodiment may further comprise an extension portion operably engaged with the exterior wall; wherein the extension portion extends outwardly away from one of the front bulkhead and the rear bulkhead. This exemplary embodiment or another exemplary embodiment may further provide that the false bulkhead further comprises a base plate; and a circumferential lip extending laterally from the base plate towards the extension portion, wherein a portion of the circumferential lip is adapted to be operably engaged with the extension portion. This exemplary embodiment or another exemplary embodiment may further provide that the trailer further comprises at least one locking mechanism operably engaging the first false bulkhead with the extension portion, wherein the at least one locking mechanism is adapted to maintain the false bulkhead with the extension portion. This exemplary embodiment or another exemplary embodiment may further provide that the drainage system further comprises an exterior chamber defined between the false bulkhead and one of the front bulkhead and the rear bulkhead for concealing drainage of precipitation from a top end of the main body to a bottom end of the main body; wherein the exterior chamber is defined exterior to the interior chamber of the main body. This exemplary embodiment or another exemplary embodiment may further provide that the false bulkhead further comprises a plurality of apertures defined in the base plate, wherein each aperture of the plurality of apertures is adapted to receive and house an associated brake light of a plurality of brake lights to operably engage with the false bulkhead. This exemplary embodiment or another exemplary embodiment may further comprise a first set of attachment openings defined in the extension portion; a second set of attachment opening defined in a circumferential lip of the false bulkhead; and a set of attachment mechanisms operably engaging the false bulkhead with the extension portion via the first and second set of attachment openings. This exemplary embodiment or another exemplary embodiment may further comprise a bead of epoxy operably engaging the false bulkhead with the main body; wherein the bead of epoxy is adapted to prevent the escapement of precipitation being drained exterior to the interior chamber. This exemplary embodiment or another exemplary embodiment may further comprise an opposing second extension portion operably engaged with the exterior wall; wherein the extension portion extends outwardly away from one of the front bulkhead and the rear bulkhead. This exemplary embodiment or another exemplary embodiment may further comprise a removable second false bulkhead operably engaged with the second extension portion, said false bulkhead being located a second distance away from one of the front bulkhead and the rear bulkhead. This exemplary embodiment or another exemplary embodiment may further comprise a second exterior chamber defined between the second false bulkhead and one of the front bulkhead and the rear bulkhead for concealing drainage of precipitation from a top end of the main body to the bottom end of the main body; wherein the second exterior chamber is defined exterior to the interior chamber of the main body. This exemplary embodiment or another exemplary embodiment may further comprise a first material that makes the main body; and a second material that makes the removable false bulkhead, wherein the second material is different than the first material. This exemplary embodiment or another exemplary embodiment may further provide that the main body is made of aluminum; and wherein the removable false bulkhead is made of stainless steel. This exemplary embodiment or another exemplary embodiment may further provide that the main body is made of aluminum; and wherein the removable false bulkhead is made of a fabric material.

In yet another aspect, an exemplary embodiment of the present disclosure may provide a trailer. The trailer includes a main body having a front bulkhead, an opposing rear bulkhead, an exterior wall operably engaged with the front and rear bulkheads, and at least one interior chamber defined collectively by the front bulkhead, the rear bulkhead, and the exterior wall, said at least one interior chamber being adapted to carry a load. The trailer includes a removable false bulkhead operably engaged with the main body, said false bulkhead being located a distance away from one of the front bulkhead and the rear bulkhead. The trailer includes an extension portion operably engaged with the exterior wall; wherein the extension portion extends outwardly away from one of the front bulkhead and the rear bulkhead.

This exemplary embodiment or another exemplary embodiment may further provide that the false bulkhead further comprises a base plate; and a circumferential lip extending laterally from the base plate towards the extension portion, wherein a portion of the circumferential lip is adapted to be operably engaged with the extension portion. This exemplary embodiment or another exemplary embodiment may further comprise that the trailer further comprises at least one locking mechanism operably engaging the first false bulkhead with the extension portion, wherein the at least one locking mechanism is adapted to maintain the false bulkhead with the extension portion. This exemplary embodiment or another exemplary embodiment may further provide that the drainage system further comprises an exterior chamber defined between the false bulkhead and one of the front bulkhead and the rear bulkhead for concealing drainage of precipitation from a top end of the main body to a bottom end of the main body; wherein the exterior chamber is defined exterior to the interior chamber of the main body. This exemplary embodiment or another exemplary embodiment may further provide that the false bulkhead further comprises a plurality of apertures defined in the base plate, wherein each aperture of the plurality of apertures is adapted to receive and house an associated brake light of a plurality of brake lights to operably engage with the false bulkhead. This exemplary embodiment or another exemplary embodiment may further comprise a first set of attachment openings defined in the extension portion; a second set of attachment opening defined in a circumferential lip of the false bulkhead; and a set of attachment mechanisms operably engaging the false bulkhead with the extension portion via the first and second set of attachment openings. This exemplary embodiment or another exemplary embodiment may further comprise a bead of epoxy operably engaging the false bulkhead to the main body; wherein the bead of epoxy is adapted to prevent the escapement of precipitation being drained exterior to the interior chamber. This exemplary embodiment or another exemplary embodiment may further comprise an opposing second extension portion operably engaged with the exterior wall; wherein the extension portion extends outwardly away from one of the front bulkhead and the rear bulkhead; a removable second false bulkhead operably engaged with the second extension portion, said false bulkhead being located a second distance away from one of the front bulkhead and the rear bulkhead; and a second exterior chamber defined between the second false bulkhead and one of the front bulkhead and the rear bulkhead for concealing drainage of precipitation from a top end of the main body to the bottom end of the main body; wherein the second exterior chamber is defined exterior to the interior chamber of the main body.

In yet another aspect, an exemplary embodiment of the present disclosure may provide a trailer. The trailer includes a main body having a front bulkhead, an opposing rear bulkhead, an exterior wall operably engaged with the front and rear bulkheads, and at least one interior chamber defined collectively by the front bulkhead, the rear bulkhead, and the exterior wall, said at least one interior chamber being adapted to carry a load. The trailer includes a removable false bulkhead operably engaged with the main body, said false bulkhead being located a distance away from one of the front bulkhead and the rear bulkhead. The trailer includes an extension portion operably engaged with the exterior wall; wherein the extension portion extends outwardly away from one of the front bulkhead and the rear bulkhead. The trailer includes an exterior chamber defined between the false bulkhead and one of the front bulkhead and the rear bulkhead for concealing drainage of precipitation from a top end of the main body to a bottom end of the main body; wherein the exterior chamber is defined exterior to the interior chamber of the main body.

This exemplary embodiment or another exemplary embodiment may further provide that the main body is made of aluminum; and wherein the first false bulkhead is made of stainless steel. This exemplary embodiment or another exemplary embodiment may further provide that the main body is made of aluminum; and wherein the first false bulkhead is made of fabric material. This exemplary embodiment or another exemplary embodiment may further comprise an extension portion operably engaged with the exterior wall; wherein the extension portion extends outwardly away from one of the front bulkhead and the rear bulkhead. This exemplary embodiment or another exemplary embodiment may further provide that the false bulkhead further comprises a base plate; and a circumferential lip extending laterally from the base plate towards the extension portion, wherein a portion of the circumferential lip is adapted to be operably engaged with the extension portion. This exemplary embodiment or another exemplary embodiment may further provide that the trailer further comprises at least one attachment mechanism operably engaging the first false bulkhead with the extension portion, wherein the at least one locking mechanism is adapted to maintain the false bulkhead with the extension portion. This exemplary embodiment or another exemplary embodiment may further provide that the drainage system further comprises an exterior chamber defined between the false bulkhead and one of the front bulkhead and the rear bulkhead for concealing drainage of precipitation from a top end of the main body to a bottom end of the main body; wherein the exterior chamber is defined exterior to the interior chamber of the main body. This exemplary embodiment or another exemplary embodiment may further provide that the false bulkhead further comprises a plurality of apertures defined in the base plate, wherein each aperture of the plurality of apertures is adapted to receive and house an associated brake light of a plurality of brake lights to operably engage with the false bulkhead. This exemplary embodiment or another exemplary embodiment may further comprise a first set of attachment openings defined in the extension portion; a second set of attachment opening defined in a circumferential lip of the false bulkhead; and a set of attachment mechanisms operably engaging the false bulkhead with the extension portion via the first and second set of attachment openings. This exemplary embodiment or another exemplary embodiment may further comprise a bead of epoxy operably engaging the false bulkhead to the main body; wherein the bead of epoxy is adapted to prevent the escapement of precipitation being drained exterior to the interior chamber. This exemplary embodiment or another exemplary embodiment may further comprise an opposing second extension portion operably engaged with the exterior wall; wherein the extension portion extends outwardly away from one of the front bulkhead and the rear bulkhead. This exemplary embodiment or another exemplary embodiment may further comprise a removable second false bulkhead operably engaged with the second extension portion, said false bulkhead being located a second distance away from one of the front bulkhead and the rear bulkhead; wherein the false bulkhead is made of the second material. This exemplary embodiment or another exemplary embodiment may further comprise a second exterior chamber defined between the second false bulkhead and one of the front bulkhead and the rear bulkhead for concealing drainage of precipitation from a top end of the main body to the bottom end of the main body; wherein the second exterior chamber is defined exterior to the interior chamber of the main body.

In yet another aspect, an exemplary embodiment of the present disclosure may provide a trailer. The trailer includes a main body having a front bulkhead, an opposing rear bulkhead, an exterior wall operably engaged with the front and rear bulkheads, and at least one interior chamber defined collectively by the front bulkhead, the rear bulkhead, and the exterior wall, said at least one interior chamber being adapted to carry a load; wherein the main body is made of aluminum. The trailer also includes a removable false bulkhead operably engaged with the main body, said false bulkhead being located a distance away from one of the front bulkhead and the rear bulkhead; wherein the first false bulkhead is made of stainless steel.

This exemplary embodiment or another exemplary embodiment may further provide that the false bulkhead further comprises a base plate; and a circumferential lip extending laterally from the base plate towards the main body, wherein a portion of the circumferential lip is adapted to be operably engaged with the main body. This exemplary embodiment or another exemplary embodiment may further provide that the trailer further comprises at least one attachment mechanism operably engaging the first false bulkhead with the main body, wherein the at least one locking mechanism is adapted to maintain the false bulkhead with main body. This exemplary embodiment or another exemplary embodiment may further provide that the drainage system further comprises an exterior chamber defined between the false bulkhead and one of the front bulkhead and the rear bulkhead for concealing drainage of precipitation from a top end of the main body to a bottom end of the main body; wherein the exterior chamber is defined exterior to the interior chamber of the main body. This exemplary embodiment or another exemplary embodiment may further provide that the false bulkhead further comprises a plurality of apertures defined in the base plate, wherein each aperture of the plurality of apertures is adapted to receive and house an associated brake light of a plurality of brake lights to operably engage with the false bulkhead. This exemplary embodiment or another exemplary embodiment may further comprise a first set of attachment openings defined in the main body; a second set of attachment opening defined in a circumferential lip of the false bulkhead; and a set of attachment mechanisms operably engaging the false bulkhead with the main body via the first and second set of attachment openings. This exemplary embodiment or another exemplary embodiment may further comprise a bead of epoxy operably engaging the false bulkhead to the main body; wherein the bead of epoxy is adapted to prevent the escapement of precipitation being drained exterior to the interior chamber. This exemplary embodiment or another exemplary embodiment may further comprise a removable second false bulkhead operably engaged with the main body, said second false bulkhead being located a second distance away from one of the front bulkhead and the rear bulkhead; wherein the second false bulkhead is made of stainless steel; and a second exterior chamber defined between the second false bulkhead and one of the front bulkhead and the rear bulkhead for concealing drainage of precipitation from a top end of the main body to the bottom end of the main body; wherein the second exterior chamber is defined exterior to the interior chamber of the main body.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 5 (FIG. 5) is a partial sectional view of the trailer equipped with the drainage system taken in the direction of line 5-5 shown in FIG. 4A.

FIG. 6 (FIG. 6) is a partial sectional view of the trailer equipped with the drainage system taken in the direction of line 6-6 shown in FIG. 3A, wherein rainwater is accumulated in a trough of the trailer.

Similar numbers refer to similar parts throughout the drawings.

DETAILED DESCRIPTION

Figure 1:
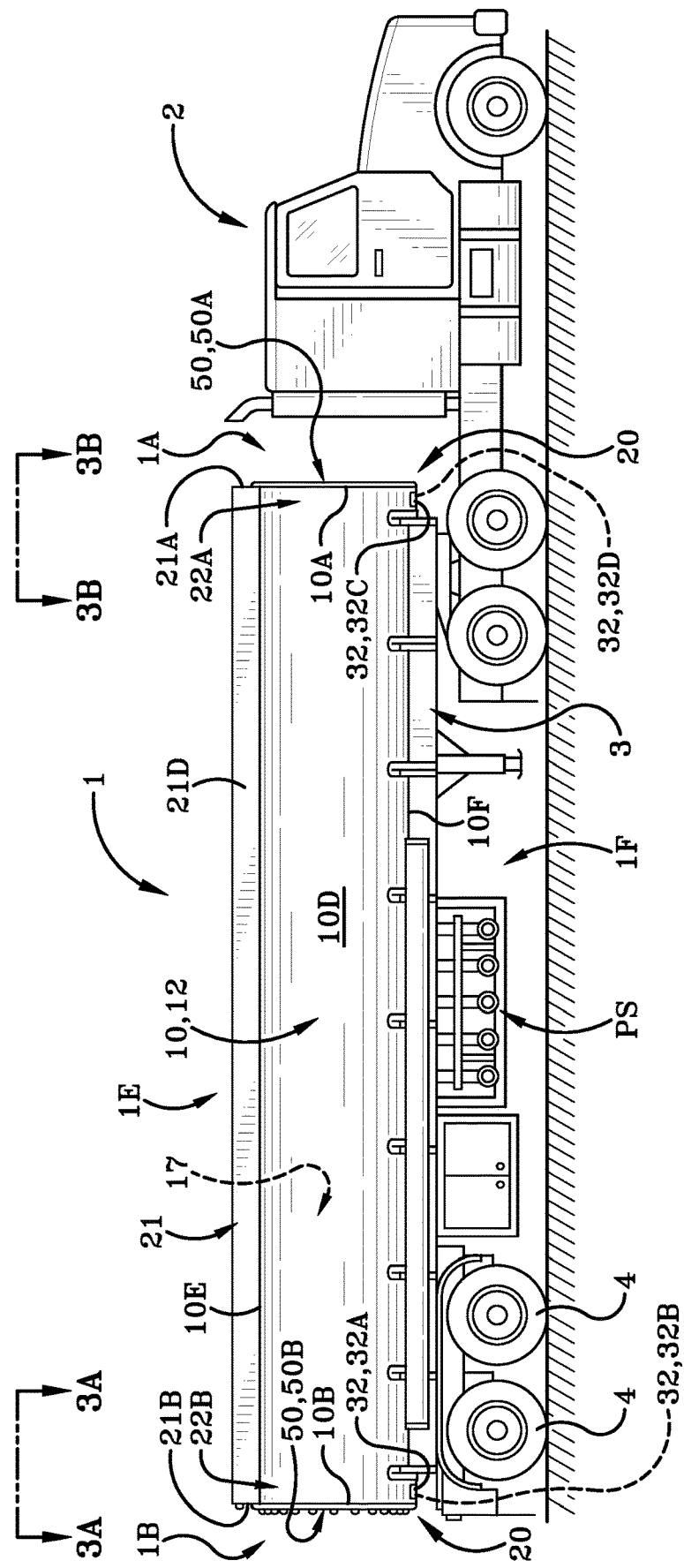
FIG. 1 (FIG. 1) is left side elevation view of a trailer operably engaged with a vehicle, wherein the trailer is equipped with a drainage system in accordance with an aspect of the present disclosure.

FIG. 1 illustrates a trailer or towed vehicle, which is generally indicated by the reference number 1. The trailer 1 illustrated in FIG. 1 is a tank trailer. It will be understood that the illustrated trailer 1 is exemplary only and any type of trailer is contemplated to be represented by the illustrated trailer. Exemplary trailers considered suitable herein include enclosed trailers, dry van trailers, dump trailers, transfer trailers, pneumatic tank trailers, liquid tank trailers, horse trailers, livestock trailers, tilt trailers, utility trailers, and any other similar trailers of the like for the purpose of being towed.

As illustrated in FIG. 1, the trailer 1 has a front end 1A, an opposing rear end 1B, and a longitudinal direction defined therebetween where the trailer 1 may travel forwardly and backwardly along the longitudinal direction when operably engaged with a towing vehicle (described below). The trailer 1 also has a first side or left side 1C, an opposing second side or right side 1D, and a transverse direction defined therebetween where the trailer 1 may travel laterally (i.e., turning left and/or right) along the transverse direction when operably engaged with a towing vehicle (described below). The trailer 1 also has a top end 1E, an opposing bottom end 1F, and a vertical direction defined therebetween for draining accumulated precipitation, which is described in more detail below.

Still referring to FIG. 1, the trailer 1 may be mechanically connected to a vehicle or towing vehicle, which is generally indicated by the reference number 2. In FIG. 1, the vehicle 2 is a semi-truck mechanically connected to the trailer 1. It will be understood that the illustrated vehicle 2 is exemplary only and any type of vehicle is contemplated to be represented by the illustrated vehicle. Exemplary vehicles considered suitable herein include motorcycles, all-terrain vehicles, cars, sport utility vehicles (SUV), pickup trucks, vans, recreational vehicles, commercial trucks, and any other vehicles of the like for the purpose of towing a trailer.

Still referring to FIG. 1, the trailer 1 may include a main body 10. The main body 10 may be operably engaged with a frame 3 of the trailer 1. The frame 3 includes at least one wheel and/or tire 4 operably engaged with the frame 3 for suitable moving and transporting the trailer 1 with the vehicle 2. The frame 3 may include any suitable components and/or assemblies for loading and unloading cargo or a load from the main body 10, parking or maintaining the trailer 1 when disconnected from the vehicle 2, providing energy or power to the trailer when disconnected from the vehicle 2, and other suitable components and/or assemblies of the like.

Figure 2:
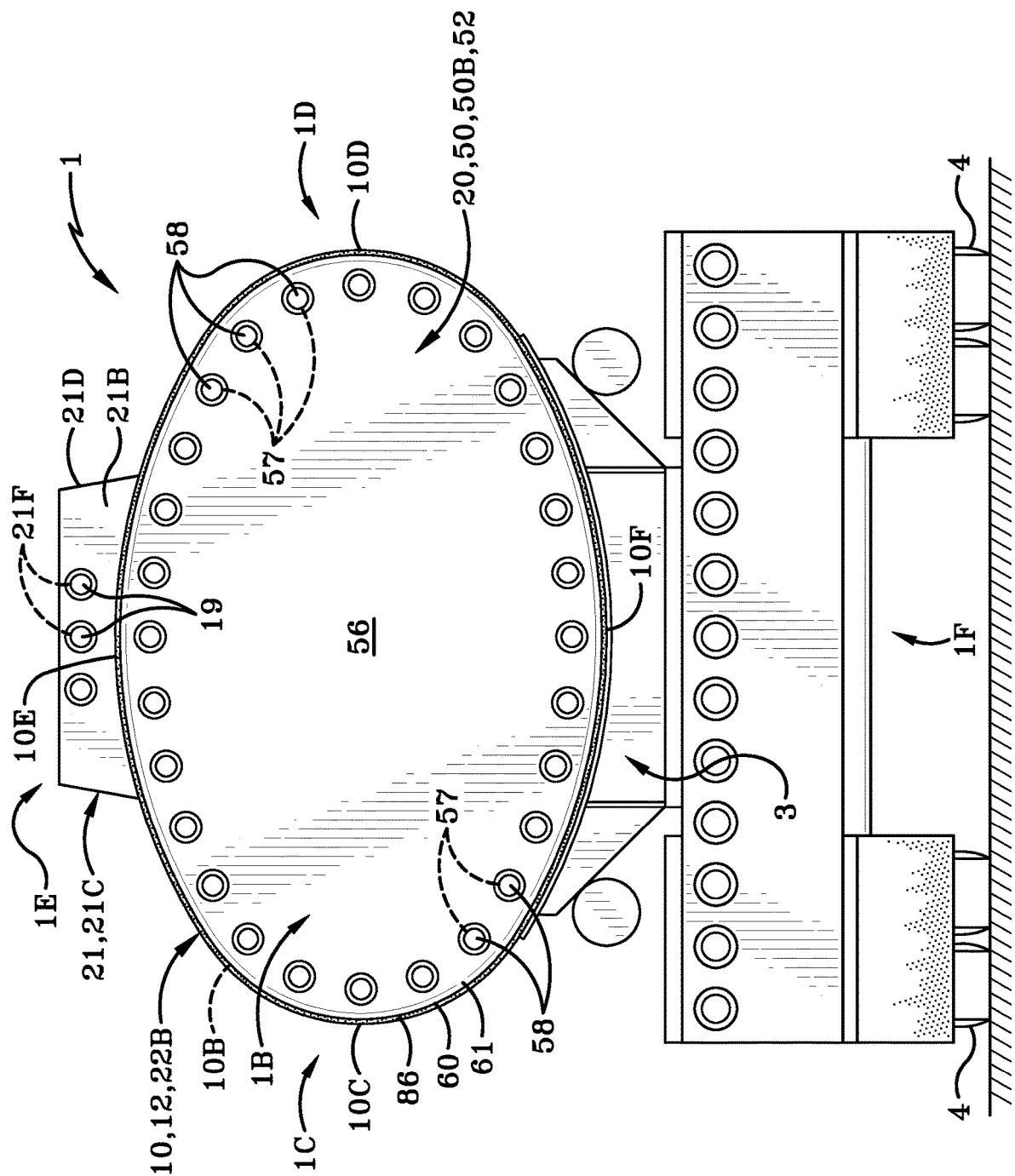
FIG. 2 (FIG. 2) is a rear elevation view of the trailer equipped with the drainage system shown in FIG. 1.

Referring to FIGS. 1 and 2, the main body 10 may have a front end 10A, an opposing rear end 10B, and a longitudinal axis defined therebetween. The main body 10 also has a first side or left side 10C, an opposing second side or right side 10D, and a transverse axis defined therebetween. The main body 10 also has a top end 10E, an opposing bottom end 10F, and a vertical axis defined therebetween. The main body 10 also includes a circumferential wall or exterior wall 12 that extends from the front end 10A to the rear end 10B along the longitudinal axis. The circumferential wall 12 also operably engages with frame 3 for maintaining the main body 10 with the frame 3.

Figure 3A:
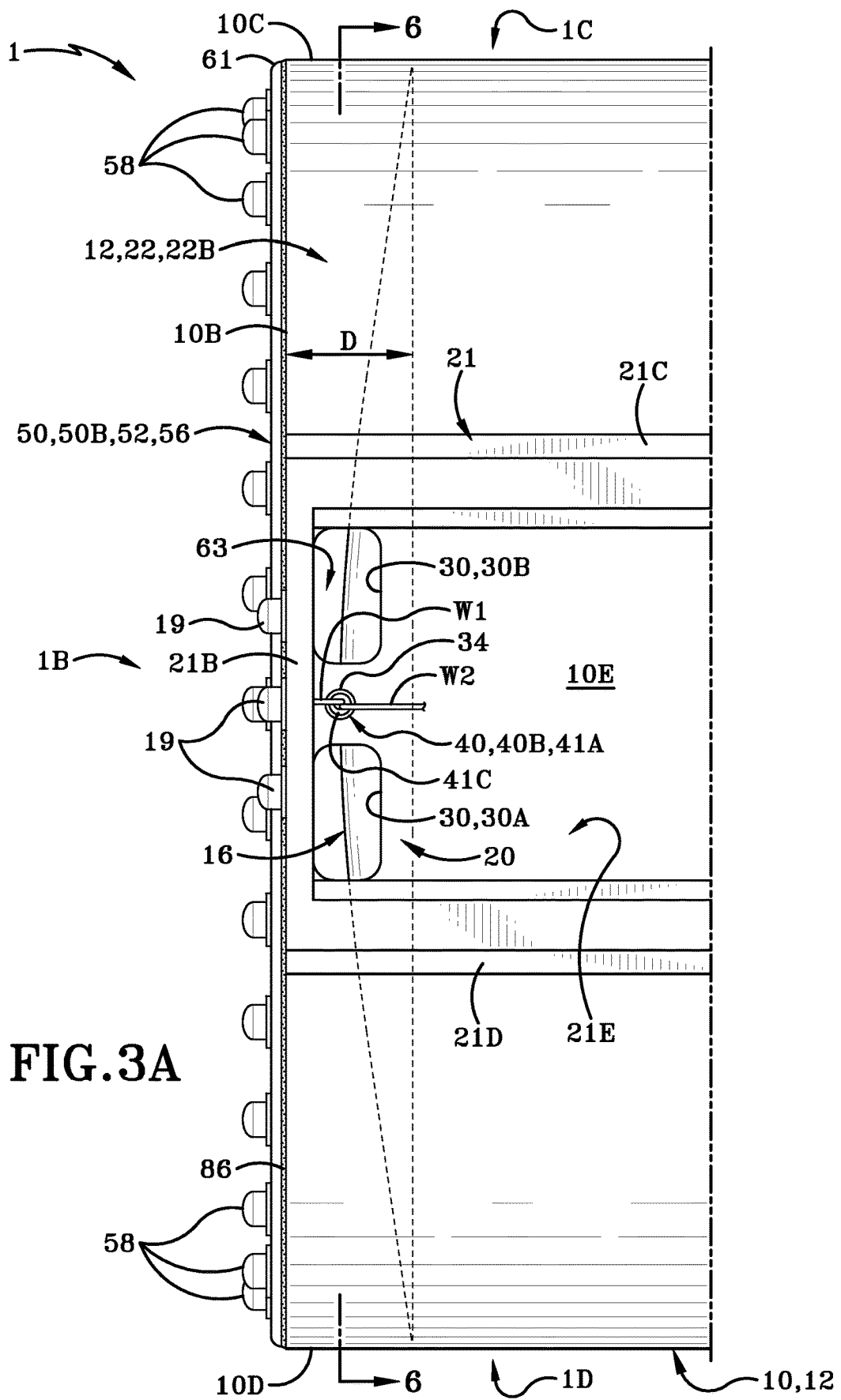
FIG. 3A (FIG. 3A) is a partial top plan view of the trailer equipped with the drainage system taken in the direction of line 3A-3A shown in FIG. 1.
Figure 3B:
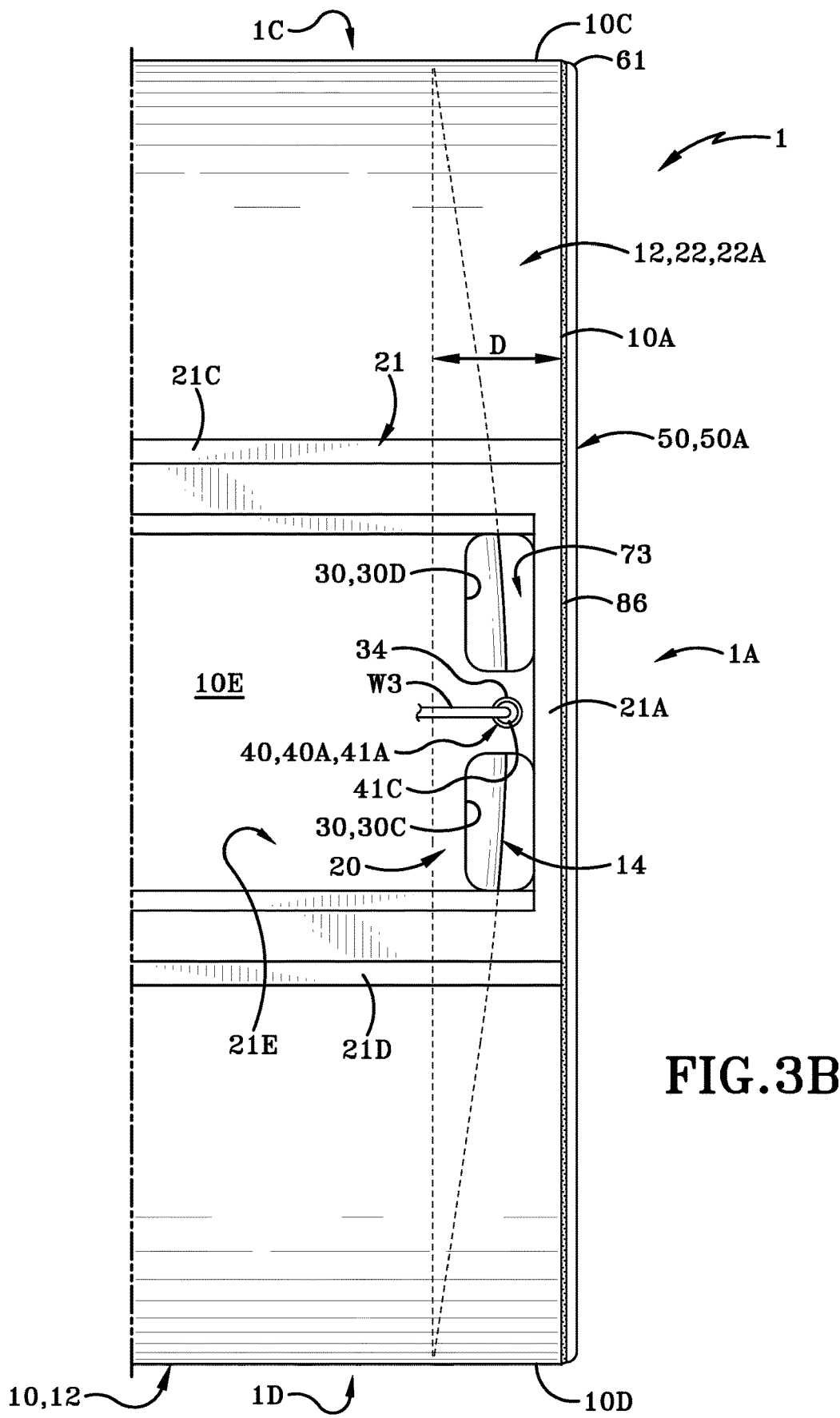
FIG. 3B (FIG. 3B) is a partial top plan view of the trailer equipped with the drainage system taken in the direction of line 3B-3B shown in FIG. 1.

Referring to FIGS. 3B, the main body 10 may include a front bulkhead 14 operably engaged with the circumferential wall 12 at the front end 10A of the main body 10 proximate to the vehicle 2. The main body 10 may also include an opposing rear bulkhead 16 (see FIGS. 3A and 4B-7) operably engaged with the circumferential wall 12 at the rear end 10B of the main body 10. Additionally, the circumferential wall 12, the front bulkhead 14, and the rear bulkhead 16 may collectively define at least one interior chamber 17 that extends from the front bulkhead 14 to the rear bulkhead 16.

The at least one interior chamber 17 may be accessible at various location along the main body 10 for loading cargo into the at least one interior chamber 17 and/or and for unloading cargo from the at least one interior chamber 17. As illustrated in FIG. 1, a piping system "PS" of the trailer 1 may be in fluid communication with the at least one interior chamber 17 of the main body 10 for loading cargo into the at least one interior chamber 17 and for unloading cargo from the at least one interior chamber 17. In other exemplary embodiments, any suitable number of inlets and outlets may be defined in the main body 10 for loading cargo into the at least one interior chamber 17 and for unloading cargo from the at least one interior chamber 17.

While the main body 10 defines at least one interior chamber 17 accessible by the piping system "PS, any suitable number of interior chambers may be defined by the main body and accessible by any suitable number of pipes in a piping system. In one exemplary embodiment, a main body may include an interior bulkhead positioned between a front bulkhead and a rear bulkhead where the main body defines a first interior chamber between the front bulkhead and the interior bulkhead and a second interior chamber between the rear bulkhead and the interior bulkhead. In another exemplary embodiment, a main body may include a plurality of interior bulkheads positioned between a front bulkhead and a rear bulkhead where the main body defines a plurality of interior chambers between each interior bulkhead, the front bulkhead, and the rear bulkhead.

Referring to FIGS. 1-7, the trailer 1 includes a drainage system 20 in accordance with an aspect of the present disclosure. The drainage system 20 may conceal or mask any potential stains or rust created on one or both of the front bulkhead 14 and rear bulkhead 16 via rainwater or other forms of liquid precipitation (e.g., melted ice, snow, sleet, and other forms of liquid precipitation). Drainage system 20 is operably engaged with the main body 10. The drainage system 20 is positioned exterior to the at least one interior chamber 17 of the main body 10 in which fluid or liquid is conveyed or drained outside of the interior chamber 17 and away from the trailer 1. As illustrated in FIGS. 3A-3B, the drainage system 20 may be configured for concealing drainage of fluid or liquid (such as rainwater) from the trough 21 to the bottom end of the main body 10 and away from the trailer 1. The drainage system 20 is considered advantageous at least because the drainage system 20 may prevent against unwanted stains or blemishes caused by precipitation dripping down the exposed front bulkhead 14 or rear bulkhead 16.

Referring to FIGS. 1-4A, the drainage system 20 may include a trough 21. The trough 21 may be operably engaged with the main body 10 along the top end 10E of the main body 10. The trough 21 may extend between the front and rear ends 10A, 10B of the main body 10. The trough 21 may also extend beyond the front bulkhead 14 and the rear bulkhead 16 of the main body 10, which is described in more detail below.

Figure 7:
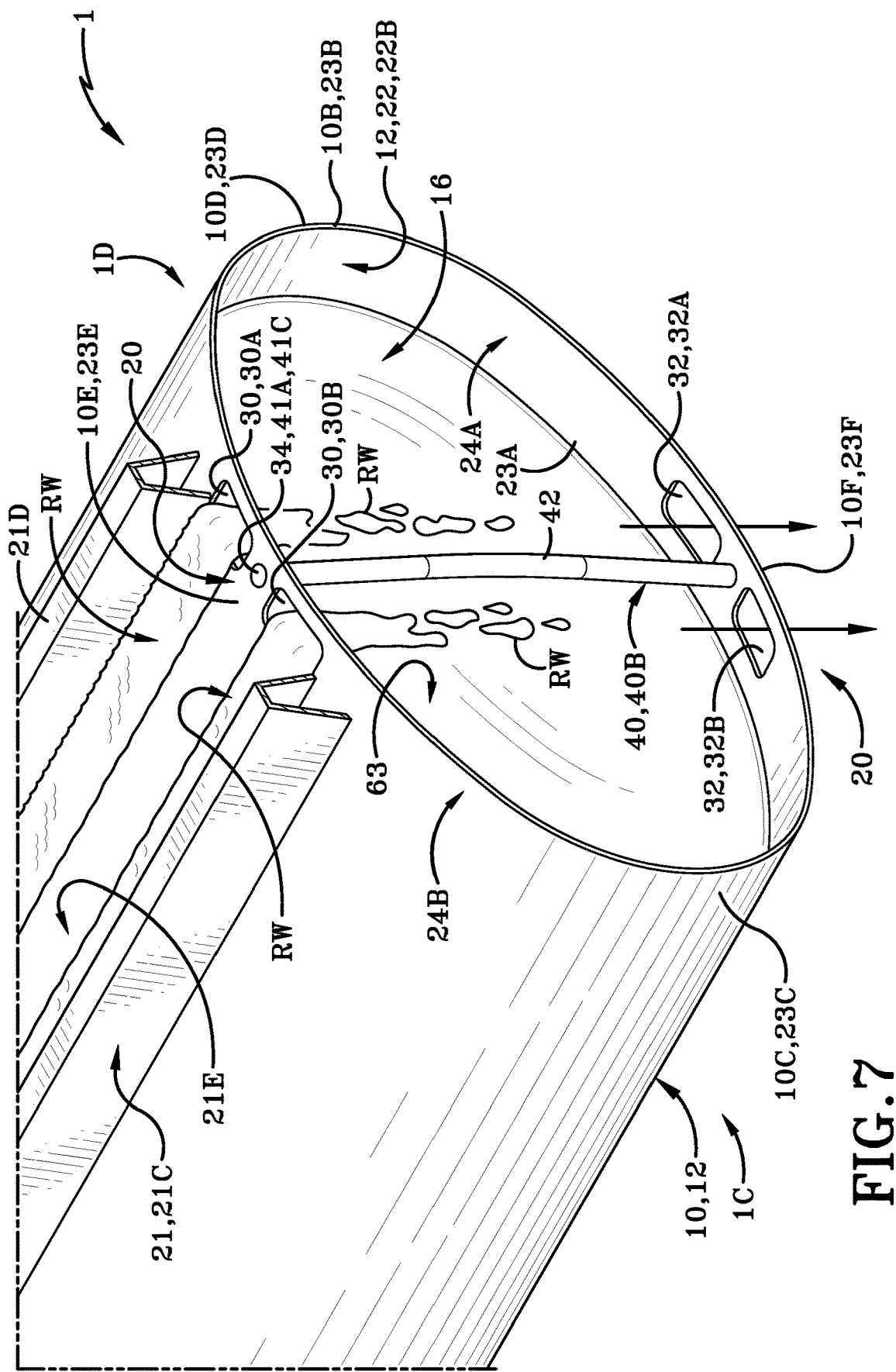
FIG. 7 (FIG. 7) is an operational view of the trailer equipped with the drainage system shown in FIG. 1, wherein rainwater drains from upper openings defined in a drainage portion to lower openings defined in the drainage portion of the drainage system, and wherein the rear false bulkhead is removed from the trailer for viewing the drainage operation.

As illustrated in FIGS. 3A-3B, the trough 21 may include a front wall 21A, an opposing rear wall 21B, a first side or left wall 21C, and an opposing second side or right wall 21D. The trough 21 may define a channel 21E collectively by the front wall 21A, rear wall 21B, left wall 21C, and right wall 21D. The channel 21E also extends along the entire length of the trough 21 parallel to the longitudinal axis of the trailer 1. The channel 21E defined by the trough 21 may be configured to gather and capture liquid or fluid that enters into the channel 21E. As illustrated in FIGS. 6-7, rainwater "RW" or other forms of precipitation may be gathered and captured in the channel 21E. Additionally, the trough 21 may be configured to convey rainwater "RW" or other forms of precipitation in liquid form from the top end 10E of the main body 10 towards an on-board drainage system, which is described in more detail below.

Referring to FIG. 5, the trough 21 may define a plurality of through-holes 18F at the rear end 10B of the main body 10. The plurality of through-holes 18F defined by the trough 21 may be configured to receive and house a set of brake lights 19 where the set of brake lights 19 is operably engaged with the trough 21. In the illustrated embodiment, the set of brake lights 19 operably engaged with the trough 21 is used as the third brake light for the trailer 1.

In the illustrated embodiment, the main body 10 may be made of a first material, which includes the circumferential wall 12, the front bulkhead 14, the rear bulkhead 16, and the trough 21. As such, the main body 10 may be made from a metal material, specifically aluminum. Additionally, the circumferential wall 12, the front bulkhead 14, the rear bulkhead 16, and the trough 21 may be made from aluminum material. In other exemplary embodiments, any suitable metal material may be used to make a main body (and its associated components) for a trailer described and illustrated herein.

As illustrated in FIGS. 4B-7, the drainage system 20 may include at least one drainage portion 22 that is operably engaged with the main body 10. More particularly, the at least one drainage portion 22 may be a portion of the circumferential wall 12 of the main body 10. In the illustrated embodiment, a first or front drainage portion 22A of the circumferential wall 12 may extend forwardly away from the front bulkhead 14 parallel to the longitudinal axis of the trailer 1. As illustrated in FIGS. 3A, 4B-5A, and 7, a second or rear drainage portion 22B of the circumferential wall 12 may extend rearwardly away from the rear bulkhead 16 parallel to the longitudinal axis of the trailer 1. In the illustrated embodiment, the circumferential wall 12, the front drainage portion 22A, and the rear drainage portion 22B is a unibody, monolithic member that is continuous and uninterrupted. In one exemplary embodiment, one of a front drainage portion and a rear drainage portion of a drainage system is operably engaged with a circumferential wall of a main body via an attachment mechanism (e.g., joining mechanism, fusing mechanism, welding mechanism, etc.). In another exemplary embodiment, a front drainage portion and a rear drainage portion of a drainage system are operably engaged with a circumferential wall of a main body via attachment mechanisms (e.g., joining mechanisms, fusing mechanisms, welding mechanisms, etc.)

In the illustrated embodiment, the drainage system 20 includes the front drainage portion 22A and the opposing rear drainage portion 22B. The front drainage portion 22A and the opposing rear drainage portion 22B are each adapted or configured to drain accumulated precipitation from the trough 21 and away from the trailer 1 exterior to the interior chamber 17 of the main body 10. Such configuration of the drainage portions 22A, 22B prevents the potential leakage and contamination of accumulated precipitation into the interior chamber 17 of the main body 10 as compared to common drainage solutions in the art. Additionally, the first and second drainage portions 22A, 22B are substantially similar to one another and are positioned with the circumferential wall 12 in a mirrored-image orientation. Inasmuch as the drainage portions 22A, 22B are substantially similar, the following description will relate to the rear drainage portion 22B. It should be understood, however, that the description of the rear drainage portion 22B applies equally to the front drainage portion 22A.

Figure 4A:
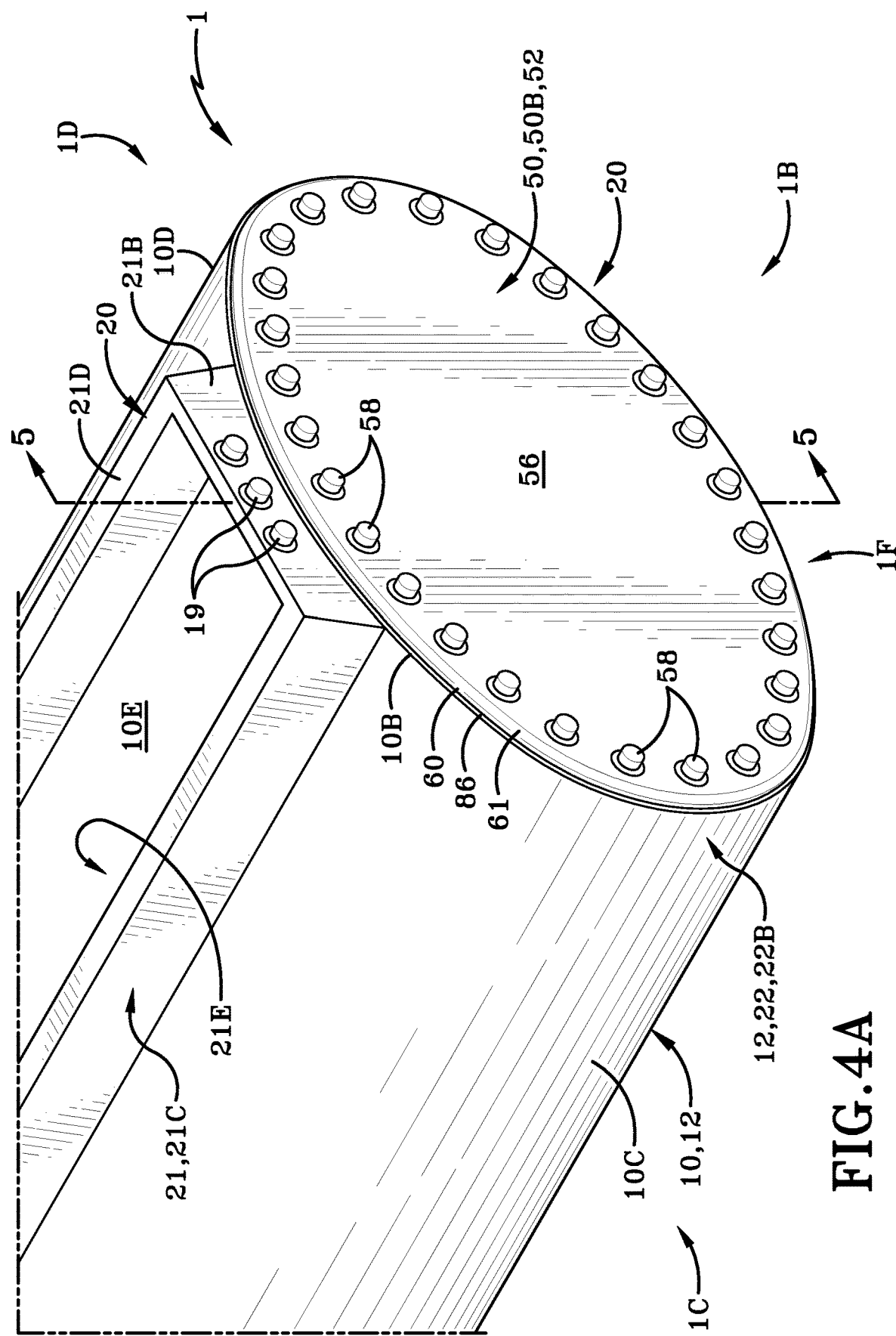
FIG. 4A (FIG. 4A) is a partial top, rear, left side isometric perspective view of the trailer equipped with the drainage system shown in FIG. 1.
Figure 4B:
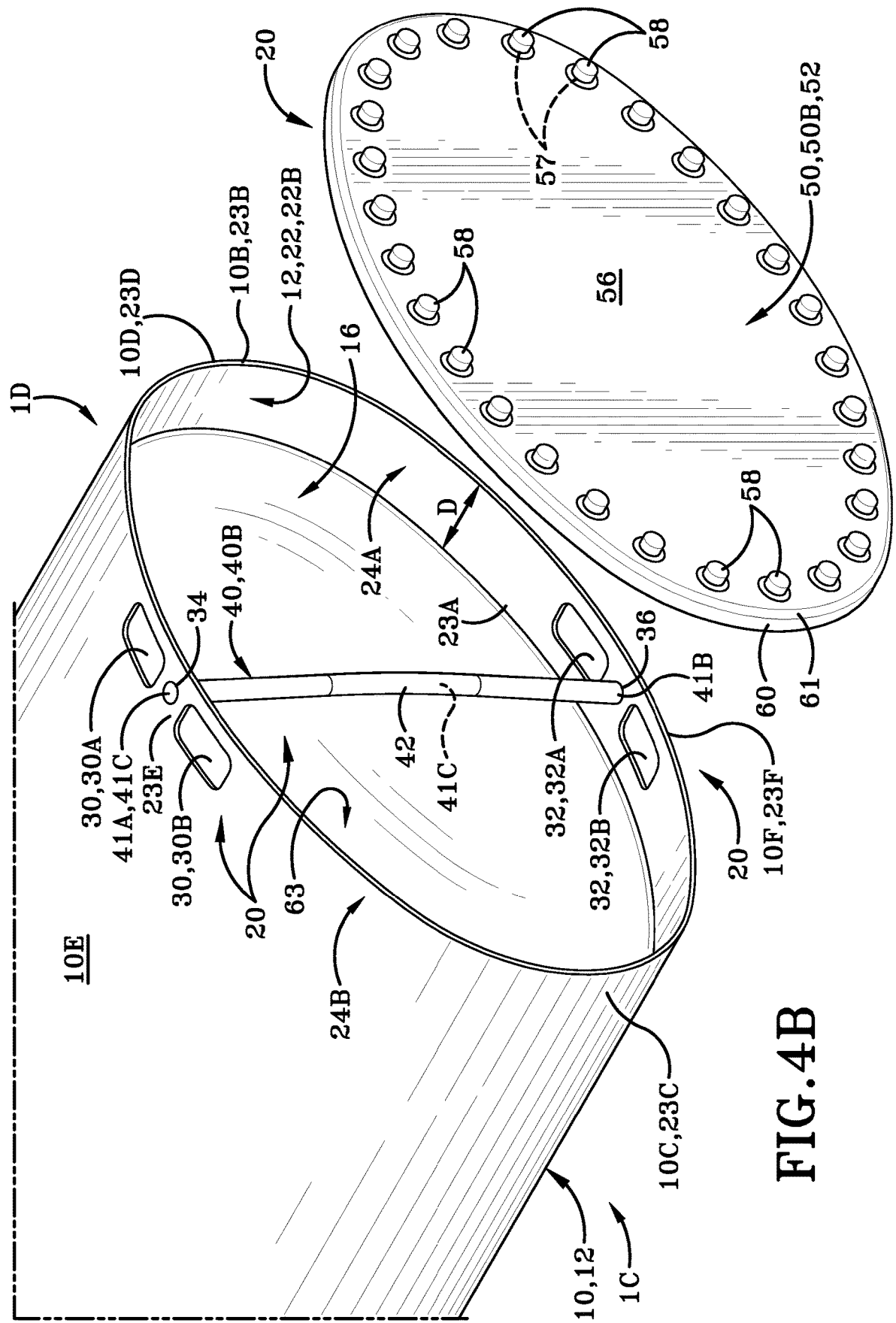
FIG. 4B (FIG. 4B) is an exploded perspective view of the trailer equipped with the drainage system, wherein a rear false bulkhead of the drainage system is removed from the trailer.
Figure 5A:
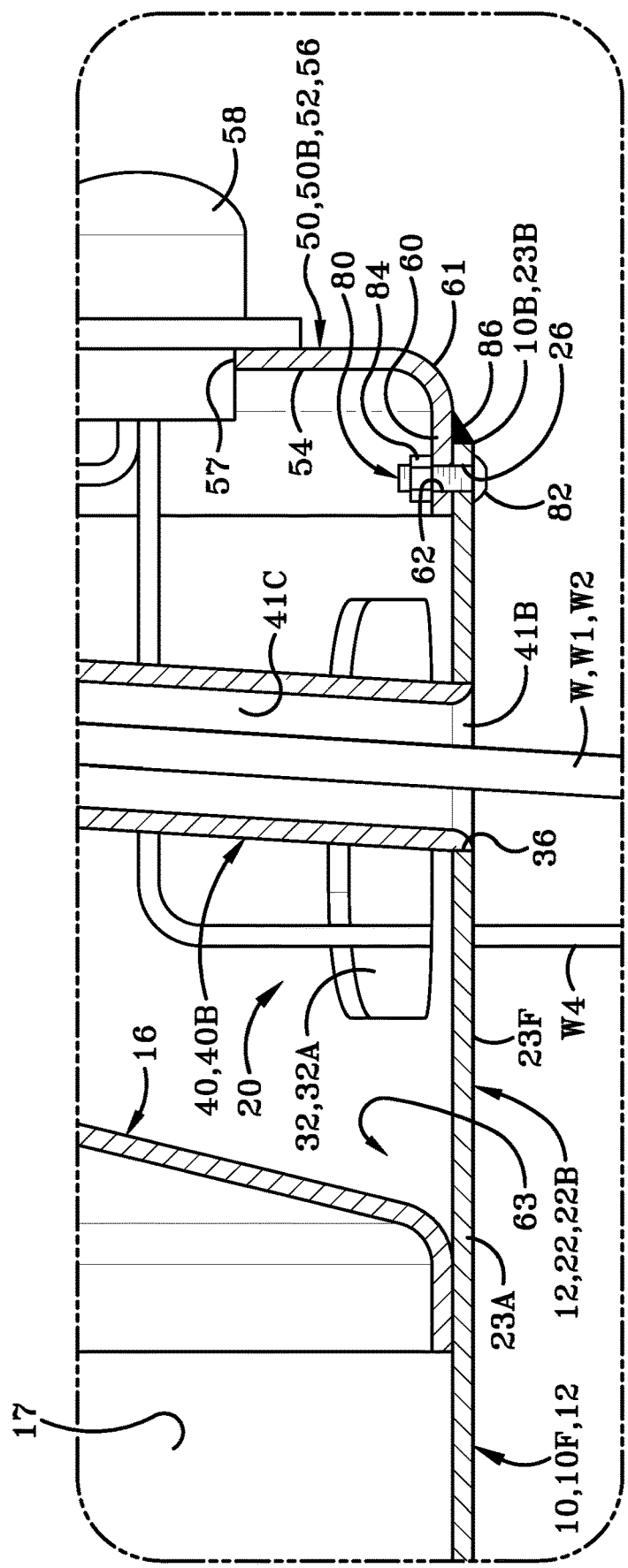
FIG. 5A (FIG. 5A) is an enlargement of the highlighted region in FIG. 5.

As illustrated in FIG. 4B, the rear drainage portion 22B may include a front end 23A proximate to the rear bulkhead 16 and an opposing rear end 23B remoted from the rear bulkhead 16. The rear drainage portion 22B may also include a first side or left side 23C and an opposing second side or right side 23D. The rear drainage portion 22B may also include a top end 23E and an opposing bottom end 23F. The rear drainage portion 22B may also have an inner surface 24A that is defined circumferentially about the rear drainage portion 22B. The inner surface 24A may extend from the rear bulkhead 16 to the rear end 23B of the rear drainage portion 22B. The rear drainage portion 22B may also have an opposing outer surface 24B that is defined circumferentially about the rear drainage portion 22B. The outer surface 24B may also extend from the rear bulkhead 16 to the rear end 23B of the rear drainage portion 22B. As illustrated in FIGS. 5 and 5A, the rear drainage portion 22B may define a first set of attachment openings 26. Each attachment opening of the first set of attachment openings 26 may extend entirely through the rear drainage portion 22B in which the inner surface 24A and the outer surface 24B are in fluid communication with one another through the first set of attachment openings 26. Such use of the first set of attachment openings 26 is described in more detail below.

The drainage system 20 may include at least one upper drain opening 30 defined in rear drainage portion 22B extending entirely through the rear drainage portion 22B. As illustrated in FIG. 3A, the drainage system 20 may include a first upper drain opening 30A and an adjacent second upper opening 30B that extend entirely through the rear drainage portion 22B in which the inner surface 24A and the outer surface 24B are in fluid communication with one another through each of the first and second upper drain openings 30A, 30B. As illustrated in FIG. 3A, the first and second upper drain openings 30A, 30B are defined proximate to the top end 10E of the main body 10. The first and second upper drain openings 30A, 30B may also be in fluid communication with the trough 21 due to the first and second upper drain openings 30A, 30B being defined inside of the channel 21E of said trough 21. Similarly, third and fourth upper drain openings 30C, 30D defined by the front drainage portion 22A may also be in fluid communication with the trough 21 due to the third and fourth upper drain openings 30C, 30C being defined inside of the channel 21E of said trough 21.

The structural configuration of the first and second upper drain openings 30A, 30B and the trough 21 is considered advantageous at least because the first and second upper drain openings 30A, 30B may provide drainage of the accumulated precipitation from the trough 21, through the rear drainage portion 22B, and away from the main body 10 and the trailer 1. In one exemplary embodiment, a portion of a trough may be sloped from a medial point of the trough towards a rear drainage portion to suitable drain liquid precipitation away from the main body that is both concealed and isolated from the interior chamber 17 of the main body 10. Moreover, the first and second upper drain openings 30A, 30B omit additional drainage members (e.g., conduits or pipe members) for draining liquid precipitation to prevent freezing or clogging with frozen precipitation or unwanted debris commonly attributed to drainage members. Similarly, the structural configuration of the third and fourth upper drain openings 30C, 30D and the trough 21 mirror the same advantageous as the first and second upper drain openings 30A, 30B and the trough 21 but on the opposing side of the trailer 1.

The drainage system 20 may include at least one lower drain opening 32 defined in rear drainage portion 22B extending entirely through the rear drainage portion 22B. As illustrated in FIG. 3A, the drainage system 20 may include a first lower drain opening 32A and an adjacent second lower opening 32B that extend entirely through the rear drainage portion 22B in which the inner surface 24A and the outer surface 24B are in fluid communication with one another through each of the first and second lower drain openings 32A, 32B. As illustrated in FIG. 3A, the first and second upper drain openings 32A, 32B are defined proximate to the bottom end 10F of the main body 10. The first and second lower drain openings 32A, 32B may also be in fluid communication with the trough 21 and the first and second upper drain openings 30A, 30B. Similarly, third and fourth lower drain openings 32C, 32D of the front drainage portion 22A may also be in fluid communication with the third and fourth upper openings 30C, 30D and trough 21.

The structural configuration of the first and second lower drain openings 32A, 32B defined by the rear drainage portion 22B is considered advantageous at least because the first and second lower drain openings 32A, 32B may provide drainage of the accumulated precipitation from the trough 21 and away from the main body 10 and the trailer 1. As illustrated in FIGS. 3A, 4B-5A, and 7, the first and second lower drain openings 32A, 32B may be aligned with the first and second upper drain openings 30A, 30B to allow for consistent flow of accumulated precipitation along a vertical axis through each associated upper and lower drain opening. Additionally, the curvature of the rear drainage portion 22B allows the inner surface 24A to act as a funnel to convey any excess fluid to drain towards one or both of the first and second lower drain openings 32A, 32B. Moreover, the first and second lower drain openings 32A, 32B omit additional drainage members (e.g., conduits or pipe members) for draining liquid precipitation to prevent freezing or clogging with frozen precipitation or unwanted debris commonly attributed to drainage members. Similarly, the structural configuration of the third and fourth lower drain openings 32C, 32D of the front drainage portion 22A mirror the same advantageous as the first and second lower drain openings 32A, 32B but on the opposing side of the trailer 1.

Figure 4C:
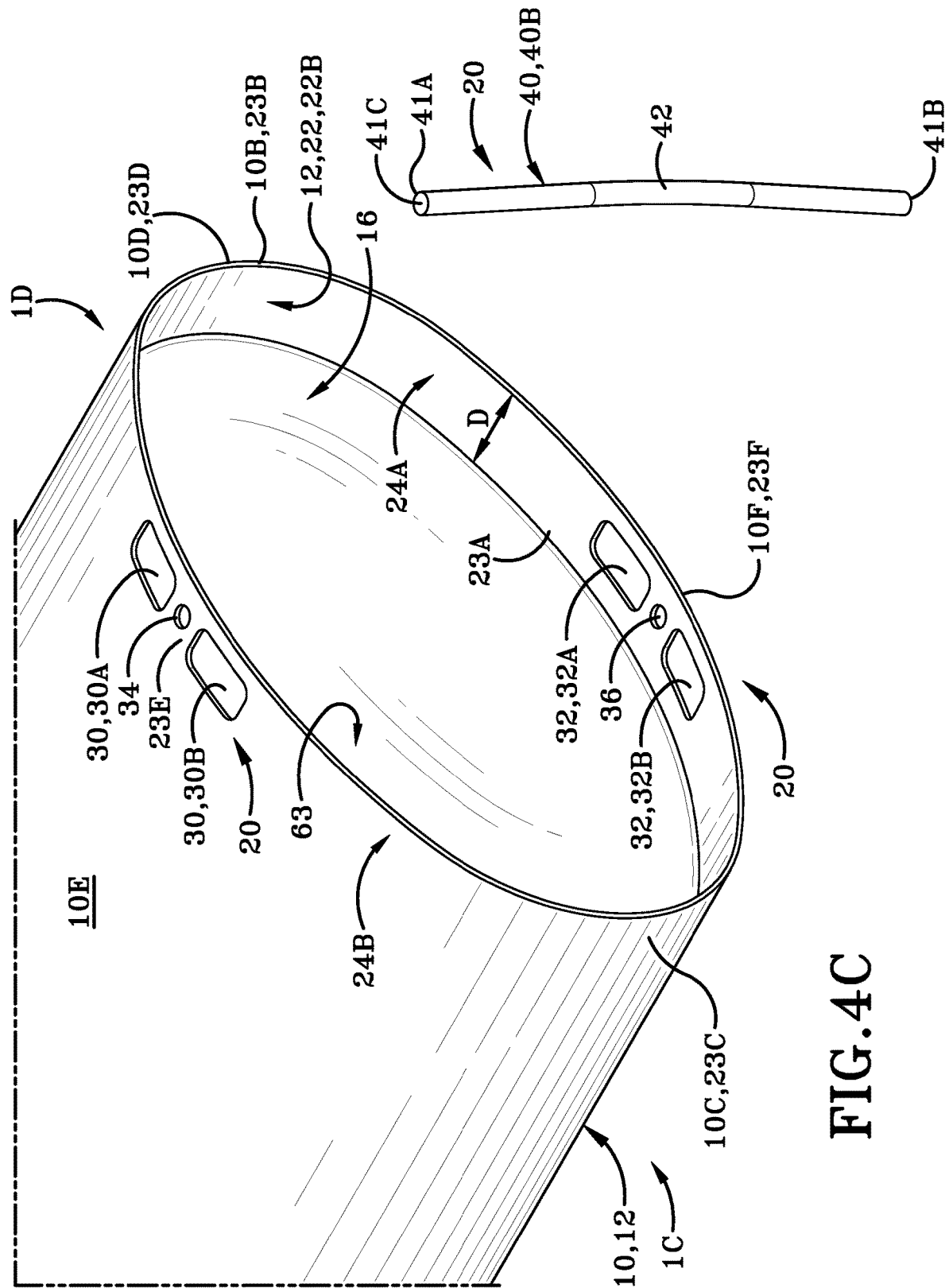
FIG. 4C (FIG. 4C) is an exploded perspective view of the trailer equipped with the drainage system, wherein a conduit of the drainage system is removed from the trailer.

The rear drainage portion 22B may define at least one upper through-hole 34 and at least one lower through-hole 36 therein. As illustrated in FIGS. 4B-4C, the rear drainage portion 22B defines an upper through-hole 34 and an opposing lower through-hole 36. In the illustrated embodiment, the upper through-hole 34 and the lower through-hole 36 may be aligned with one another that the upper through-hole 34 and the lower through-hole 36 are coaxial with one another. Similarly, the front drainage portion 22A may also define an upper through-hole 34 (see FIG. 3B) and a lower through-hole (not illustrated) substantially similar to the upper and lower through-holes 34, 36 of the rear drainage portion 22B. Such use of the upper and lower through-holes 34, 36 of each of the front drainage portion 22A and the rear drainage portion 22B is described in more detail below.

The trailer 1 may also include at least one insulated conduit 40 that is operably engaged with one or both of the front and rear drainage portions 22A, 22B of the drainage system 20. As illustrated in FIGS. 3A-7, a front conduit 40A may be operably engaged with the front drainage portion 22A via the associated upper and lower through-holes 34. Similarly, a rear conduit 40B may be operably engaged with rear drainage portion 22B via the associated upper and lower through-holes 34, 36. The front and rear conduits 40A, 40B are substantially similar to one another and are positioned with the front and rear drainage portions 22A, 22B in a mirrored-image orientation. Inasmuch as the front and rear conduits 40A, 40B are substantially similar, the following description will relate to the rear conduit 40B. It should be understood, however, that the description of the rear conduit 40B applies equally to the front conduit 40A.

As illustrated in FIGS. 4B-4C, the rear conduit 40B defines an open top end 41A, an opposing open bottom end 41B, and a passageway 41C defined therebetween. As illustrated in FIG. 4B, the top end 41A of the rear conduit 40B may be operably engaged with the rear drainage portion 22B inside of the upper through-hole 34 and proximate to the top end 10E of the main body 10. The bottom end 41B of the rear conduit 40B may be operably engaged with the rear drainage portion 22B inside of the lower through-hole 36 and proximate to the bottom end 10F of the main body 10. The rear conduit 40B may also be sized and configured to receive and house electrical wiring, mechanical lines, and other components for providing power or energy to electrical and mechanical devices on the trailer 1. As illustrated in FIGS. 3A and 5-5A, a group of electrical wiring "W" may be housed inside of the rear conduit 40B. The group of electrical wiring "W" may include at least one electrical wire. As illustrated in FIGS. 5 and 5A, the group of electrical wiring "W" may include a first wire "W1" that electrically connects the set of brake lights 19 mounted in the trough 21 to the vehicle 2 for operating the set of brake lights 19 when towing the trailer 1. The group of electrical wiring "W" may include a second wire "W2" that electrically connects other devices on the trailer 1 to the vehicle 2 or to other programmable devices on the trailer 1 (e.g., pumps, electrical switches, actuators, etc.).

As illustrated in FIGS. 3A and 6-7, the rear conduit 40B may be in fluid communication with the trough 21 due to the upper through-hole 34 of the rear drainage portion 22B being defined inside of the channel 21E of the trough 21. In the illustrated embodiment, the top end 41A is sealed once the electrical wiring and other components are housed inside of the rear conduit 40B. In one exemplary embodiment, a rear conduit may convey accumulated precipitation from the top end 41A, via the trough 21, and exits through the bottom end 41B. Moreover, the bottom end 41B is sealed once the electrical wiring and other components are housed inside of the rear conduit 40B. The front conduit 40A may be sealed substantially similar to the rear conduit 40B.

As illustrated in FIGS. 4C and 5, the rear conduit 40B may define a bend 42 between the top end 41A and the bottom end 41B of the rear conduit 40B. The bend 42 may be defined based on the curvilinear shape of the rear bulkhead 16 such that the rear conduit 40B is positioned away from the rear bulkhead 16 and not contacting the rear bulkhead 16. The front conduit 40A may also define a substantially similar bend based on the curvilinear shape of the front bulkhead 14.

Similar to the rear conduit 40B, the front conduit 40A may be configured to provide substantially similar options as provided by the rear conduit 40B. As illustrated in FIG. 3B, the front conduit 40A may also house a group of electrical wiring "W3" for providing electrical power or energy to other device and components operably engaged with the trailer 1 to load and unload cargo.

The structural arrangement between the front and rear conduits 40A, 40B and the front and rear drainage portions 22A, 22B is considered advantageous at least because the front and rear conduits 40A, 40B may house electrical wires and mechanical lines exterior to the interior chamber 17 of the main body 10 to prevent against interactions with the cargo housed inside said interior chamber 17. Such isolation of electrical wires in one or both of the front and rear conduits 40A, 40B may prevent electrical shortages due to the electrical wiring being completely removed from the chamber 17. Such isolation of mechanical lines (i.e., pneumatic lines, hydraulic lines, etc.) in one of both of the front and rear conduits 40A, 40B may prevent clogging or destruction of mechanical system due to the mechanical lines being completely removed from the interior chamber 17.

The drainage system 20 may also include at least one removable false bulkhead 50 operably engaged with one of the front drainage portion 22A and the rear drainage portion 22B. The at least one removable false bulkhead 50 is independent from one of the front bulkhead 14 and the rear bulkhead 16 of the main body 10. As illustrated in FIGS. 1 and 3B, the drainage system 20 may include a front false bulkhead 50A that is operably engaged with the front drainage portion 22A. Referring to FIGS. 1, 3A, and 4A-5A, the drainage system 20 may also include a first or rear false bulkhead 50B that is operably engaged with the rear drainage portion 22B. The front (or second) and rear (or first) false bulkheads 50A, 50B are substantially similar to one another and are positioned with the front and rear drainage portions 22A, 22B in a mirrored-image orientation. Inasmuch as the false bulkheads 50A, 50B are substantially similar, the following description will relate to the rear false bulkhead 50B. It should be understood, however, that the description of the rear false bulkhead 50B applies equally to the front false bulkhead 50A.

As illustrated in FIGS. 4A-4B and 5-5A, the rear false bulkhead 50B may include a base plate 52. The base plate 52 may have an inner surface 54 facing in a direction towards the rear bulkhead 16 of the main body 10. The base plate 52 may also have an opposing outer surface 56 facing in an opposite direction away from the rear bulkhead 16 of the main body 10. The base plate 52 may also define a plurality of apertures 57 that extends entirely through the base plate 52 where the inner surface 54 and the outer surface 56 are in fluid communication with one another through each aperture of the plurality of apertures 57. The plurality of apertures 57 is also sized and configured to receive a plurality of brake lights 58 (see FIG. 5) in which the plurality of brakes lights 58 would operably engaged with the base plate 52 via said plurality of apertures 57. Since the plurality of apertures 57 are used for operably engaging the plurality of brake lights to the rear false bulkhead 50B, the plurality of apertures 57 may be omitted from the front false bulkhead 50B.

Still referring to FIGS. 4B and 5-5A, the rear false bulkhead 50B may also include a circumferential lip 60 that is formed in the base plate 52 via a bend 61. The circumferential lip 60 may extend laterally away from the bend 61 towards the base plate 52 and towards the rear bulkhead 16 of the main body 10. As illustrated in FIGS. 5-5A, the circumferential lip 60 may define a second set of attachment openings 62 where each attachment opening of the second set of attachment openings 62 extends entirely through the circumferential lip 60. Such use of the second set of attachment openings 62 is described in more detail below. Upon assembly of the rear false bulkhead 50B with the rear drainage portion 22B, a portion of the circumferential lip 60 operably engages with the interior surface 24A of the rear drainage portion 22B inside of the rear drainage portion 22B. Upon assembly, an exterior chamber 63B is defined between the rear bulkhead 16 of the main body 10 and the rear false bulkhead 50B surrounded by the rear drainage portion 22B. The exterior chamber 63B is isolated from the interior chamber 17 defined by the main body 10. Similarly, another exterior chamber 63A is defined between the front bulkhead 14 of the main body 10 and the front false bulkhead 50A surrounded by the front drainage portion 22A. This exterior chamber 63A is also isolated from the interior chamber 17 defined by the main body 10. Such use of the exterior chambers 63A, 63B is described in more detail below.

Referring to FIGS. 5-5A, a plurality of attachment members 80 may be used to operably engage the rear false bulkhead 50B with the rear drainage portion 22B via the first and second sets of attachment openings 26, 62. Each attachment member of the plurality of attachment members 80 may include a threaded connector 82 configured to threadably engage with an associated nut 84. As illustrated in FIG. 5A, a threaded connector 82 of an attachment member of the plurality of attachment members 80 may be feed through aligned attachment openings of the first and second sets of attachment openings 26, 62. The threaded connector 82 may maintain the position of the rear false bulkhead 50B with the rear drainage portion 22B via the nut 84 threadably engaging with the threaded connector 82. In other exemplary embodiment, any suitable number of attachment members may be used to operably engage a false rear bulkhead with a rear expansion member. Similarly, the plurality of attachment member 80 may be used to operably engage the front false bulkhead 50A with the front drainage portion 22A.

As illustrated in FIG. 5A, a bead of epoxy 86 may be applied circumferential about the rear drainage portion 22B and the rear false bulkhead 50B for providing additional attachment support between the main body 10 and the rear false bulkhead 50B. In the illustrated embodiment, the bead of epoxy 86 may be applied along the rear end 23B of the rear drainage portion 22B and along the circumferential lip 60 of the rear false bulkhead 50B. The epoxy 86 may be any suitable substance or cargo that is able to adhere and/or attach the rear false bulkhead 50B to the rear drainage portion 22B of the circumferential wall 12 while preventing any fluid or precipitation from permeating through once applied. Similarly, a bead of epoxy may be applied circumferential about the front drainage portion 22A and the front false bulkhead 50A for providing additional attachment support between the main body 10 and the front false bulkhead 50A.

The structural configuration of the false bulkheads 50A, 50B with the drainage portions 22A, 22B is considered advantageous at least because the drainage of accumulated precipitation along an outer surface of the trailer 1 (at either the front or rear ends 1A, 1B) may be masked and/or concealed via the false bulkheads 50A, 50B. In other words, the accumulated precipitation may drain behind one or both of the false bulkheads 50A, 50B inside of one or both of the exterior chambers 63A, 63B. Such drainage concealment of the accumulated precipitation may prevent the displaying of unwanted stains or grime on the front end 1A or the rear end 1B of the trailer 1. By concealing the drainage, bystanders or drivers near the trailer 1 may not confuse the drainage stains or grime as the trailer 1 leaking cargo loaded in the trailer 1 (e.g., gasoline, hazardous chemicals, etc.)

The structural configuration of the drainage system 20 when using false bulkheads 50A, 50B with the drainage portions 22A, 22B is considered advantageous at least because such omission of piping and/or plumbing prevents the potential of freezing lines with frozen precipitation or clogging with debris. In one instance, the upper drain openings 30 defined in the drainage portions 22A, 22B simply convey accumulated precipitation into the exterior chambers 63A, 63B and towards the lower drain openings 32 defined in the drainage portions 22A, 22B to drain said accumulated precipitation. With the elimination of the piping and/or plumbing components, the accumulated precipitation may easily travel through these upper and lower drain openings 30, 32 due to size, shape, and configuration of the openings 30, 32 and the exterior chambers 63. Furthermore, removal of debris or frozen precipitation may be easily removed from the exterior chambers 63A, 63B by simply removing the attachment members 80 from one of the false bulkheads 50A, 50B and the one of the drainage portions 22A, 22B.

In the illustrated embodiment, the main body 10 and its associated parts and/or components are made from a first material, and the at least one removable false bulkhead 50 (one or both of the front removable false bulkhead 50A and the rear removable false bulkhead 50B) is made of a second material; the second material is different than the first material. In one example, the main body 10 may be made from aluminum, and the at least one removable false bulkhead 50 may be made from stainless steel. In another example, the main body 10 may be made from aluminum, and the at least one removable false bulkhead 50 may be made from a fabric and/or fibrous material.

Having now described the components and assemblies of the trailer 1 along with the associated drainage system 20, the method of use and/or operation of the trailer 1 with the associated drainage system 20 is described below.

Upon a towing operation, the trailer 1 may be mechanically connected to the vehicle 2 in any suitable configuration. In the current embodiment, the trailer 1 and the vehicle 2 are mechanically connected via a fifth-wheel trailer connection. Once connected, the vehicle 2 may begin towing the trailer 1 and use it for various purposes.

Upon towing, the trailer 1 and vehicle 2 may incur different forms of precipitation during normal operation (e.g., rainwater, snow, sleet, ice, etc.). During this precipitation period, precipitation may contact the top end 10E of the main body 10 where precipitation may be accumulated inside the of the channel 21E of the trough 21. As shown in FIG. 6, precipitation, such as rainwater, may fall from the surrounding atmosphere and interact with the trailer 1. The rainfall of the rainwater is denoted by arrows labeled "RF" in FIG. 6, and accumulated rainwater in the trough 21 is labeled "RW" in FIG. 6. As the rainwater "RW" or other liquid forms of precipitation begin to accumulate in the trough 21, the trough 21 is adapted to convey the rainwater "RW" towards the upper drain openings 30A, 30B, 30C, 30D defined by the front drainage portion 22A and the rear drainage portion 22B. As stated above, the process of draining accumulated precipitation from the trailer 1 will be focused on the rear portion the drainage system 20. It should be understood that this process of draining accumulated precipitation is substantially similar to the front portion of the drainage system 20.

As illustrated in FIG. 7, the rainwater "RW" is conveyed from the chamber 18E of the trough 21 and into the first and second upper drain openings 30A, 30B of the rear drainage portion 22B. As the rainwater "RW" enters the first and second upper drain openings 30A, 30B, the rainwater "RW" moves downwardly from the first and second upper drain openings 30A, 30B towards the first and second lower drain openings 32A, 32B. During this transition, the rainwater "RW" may move laterally to either side of the first and second lower drain openings 32A, 32B due to external forces placed on the rainwater "RW" (e.g., centrifugal force placed on the trailer 1 when turning with vehicle 2) or the flow rate of the rainwater "RW." In these specific cases, the rainwater "RW" may contact the interior surface 24A of the rear drainage portion 22B and/or the rear false bulkhead 50B and be directed towards the first and second lower drain openings 32A, 32B. The structural configuration of the both the rear drainage portion 22B and the rear false bulkhead 50B allows for rainwater "RW" or other types of precipitation to be funneled through the trailer 1 exterior to the interior chamber 17 of the main body 10 even through the rainwater "RW" or other types of precipitation were not directly drained through one or both of the first and second lower drain openings 32A, 32B from one or both of the first and second lower drain openings 32A, 32B. As the rainwater "RW" or other type of precipitation moves through the first and second lower drain openings 32A, 32B, the rainwater "RW" is drained into the exterior environment of the trailer 1 and away from said trailer 1.

During this drainage process, the rainwater "RW" may not enter into or pass through the upper through-hole 34 or the lower through-hole 36 of the rear drainage portion 22B due to the rear conduit 40B being sealed from exterior elements. In other words, the passageway 41C of the rear conduit 40B may be isolated from exterior elements to protect electrical wiring or mechanical plumbing for the trailer 1. As such, the precipitation accumulated in the trough 21 may pass over the upper through-hole 34 due to the conduit 40B being sealed. It should be understood that the drainage process explained above may be substantially similar to the upper and lower through-holes 34 of the front drainage portion 22A in that the front conduit 40A may be sealed to prevent against drainage of accumulated precipitation through said front conduit 40A.

The drainage system 20 of the trailer 1 is considered advantageous at least because the drainage of accumulated precipitation along an outer surface of the trailer 1 (at either the front or rear end 1A, 1B) may be masked and/or concealed via the false bulkheads 50A, 50B. In other words, the accumulated precipitation may drain behind one or both of the false bulkheads 50A, 50B inside of one or both of the exterior chambers 63A, 63B. Such drainage concealment of the accumulated precipitation may prevent the displaying of unwanted stains or grime on the front end 1A or the rear end 1B of the trailer 1. By concealing the drainage, bystanders or drivers proximate to the trailer 1 may not confuse the drainage stains or grime as the trailer 1 leaking cargo loaded in the trailer 1 (e.g., gasoline, hazardous chemicals, etc.)

The drainage system 20 of the trailer 1 is also considered advantageous at least because the drainage system 20 may prevent against clogging or freezing pipes when draining accumulated precipitation from a top end of a trailer. The drainage system 20 omits the use of drainage pipes and uses the upper and lower openings 30, 32 of the drainage system 20 to adequately drain different types of accumulated precipitation. In one instance, the drainage system 20 may allow for accumulated snow, sleet, or similar types of accumulated precipitation to adequately drain through the drainage portions 20A, 20B. Moreover, the removable false bulkheads 50A, 50B provides ease of accessing the exterior chambers 63A, 63B if precipitation freezes inside of these exterior chambers 63A, 63B or if debris is contained inside of these exterior chambers 63A, 63B.

Figure 8:
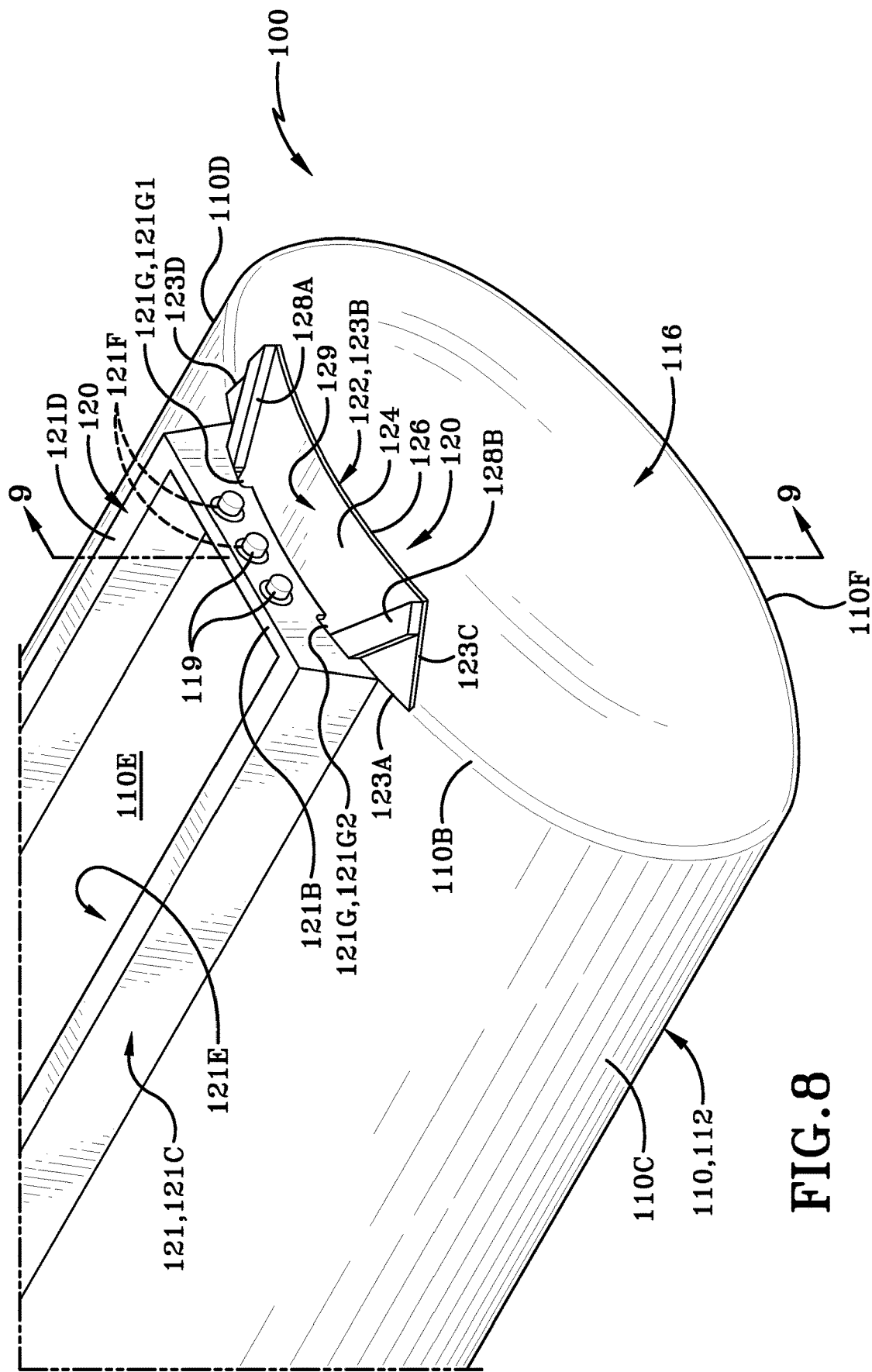
FIG. 8 (FIG. 8) is a partial top, rear, left side perspective isometric view of another trailer equipped with a drainage system in accordance with an aspect of the present disclosure.
Figure 9:
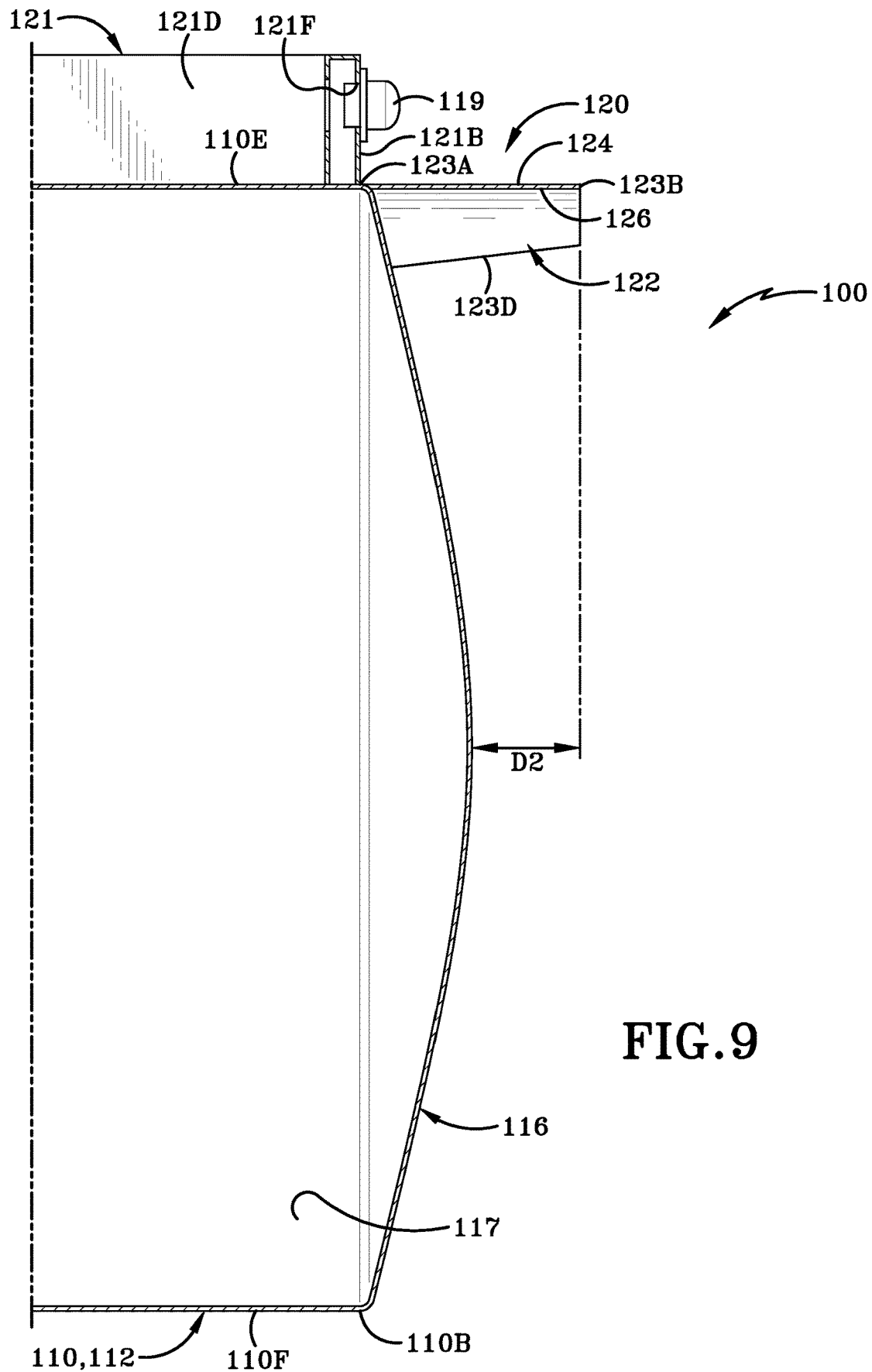
FIG. 9 (FIG. 9) is a partial sectional view of the trailer equipped with the drainage system in FIG. 8 taken in the direction of line 9-9 shown in FIG. 8.
Figure 10:
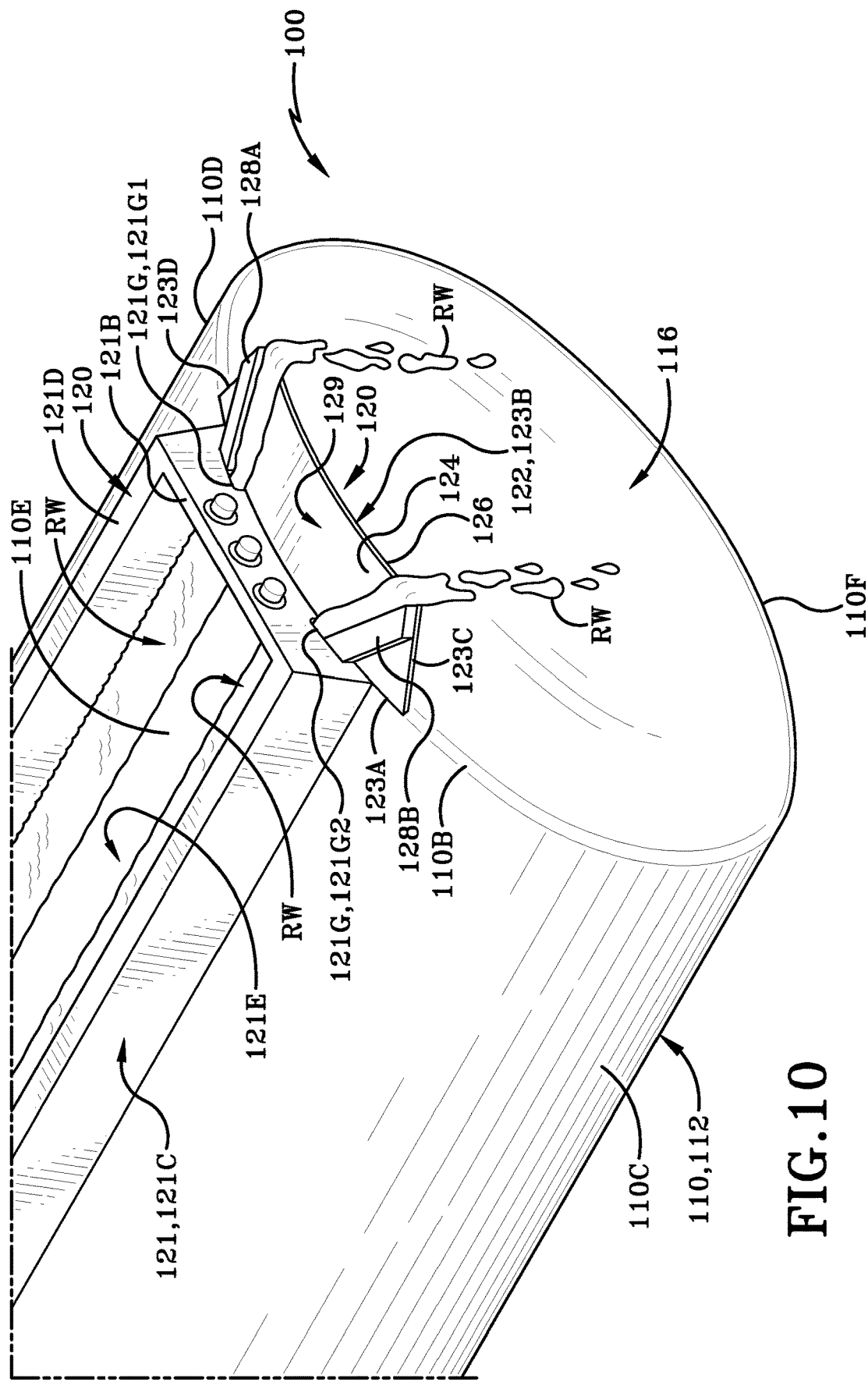
FIG. 10 (FIG. 10) is an operational view of the trailer equipped with the drainage system shown in FIG. 8, wherein rainwater drains from the trough to a gutter of the drainage system and away from the trailer.

FIGS. 8-10 illustrate another trailer 100 similar to the trailer 1 described above and illustrated in FIGS. 1-7, except as detailed below. The trailer 100 includes a drainage system 120 that is different than the drainage system 20 illustrated in FIGS. 8-10.

Referring to FIGS. 8-10, the trailer 100 includes a main body 110 that may have a front end (not illustrated), an opposing rear end 110B, and a longitudinal axis defined therebetween. The main body 110 also has a first side or left side 110C, an opposing second side or right side 110D, and a transverse axis defined therebetween. The main body 110 also has a top end 110E, an opposing bottom end 110F, and a vertical axis defined therebetween. The main body 110 also includes a circumferential wall 112 that extends from the front end to the rear end 110B along the longitudinal axis. The circumferential wall 112 may also operably engage with a frame (not illustrated) for maintaining the main body 10 with the frame.

Referring to FIGS. 3B, the main body 110 may include a front bulkhead (not illustrated) operably engaged with the circumferential wall 112 at the front end of the main body 110 proximate to a vehicle (not illustrated). The main body 110 may also include an opposing rear bulkhead 116 operably engaged with the circumferential wall 112 at the rear end 110B of the main body 110. Additionally, the circumferential wall 112, the front bulkhead, and the rear bulkhead 116 may collectively define at least one interior chamber 117 that extends from the front bulkhead to the rear bulkhead 116 similar to the interior chamber 17 of the main body 10 described above.

Referring to FIGS. 8-10, the trailer 100 includes a drainage system 120 (i.e., a drainage system) that is operably engaged with the main body 110. The drainage system 120 may include a trough 121. The trough 121 may be operably engaged with the main body 110 along the top end 110E of the main body 110 and extends between the front and rear ends of the main body 110. The trough 121 may also extend beyond the front bulkhead and the rear bulkhead 116 of the main body 110, which is described in more detail below.

The trough 121 may have a front end 121A, an opposing rear end 121B, a first side wall or left wall 121C, and an opposing second side wall or right wall 121D. The trough 121 may define a channel 121E collectively by the first end 121A, the rear end 121B, the left wall 121C, and the right wall 121D. The trough 121 extends along the entire length of the trough 121 parallel to the longitudinal axis of the trailer 100. The channel 121E defined by the trough 121 may be configured to gather and capture liquid or fluid that enters into the channel 121E. As illustrated in FIG. 10, rainwater "RW" or other forms of precipitation may be gathered and captured in the channel 121E.

Referring to FIG. 5, the trough 121 may define a plurality of through-holes 121F at the rear end 110B of the main body 110. The plurality of through-holes 121F defined by the trough 121 may be configured to receive and house a set of brake lights 119 where the set of brake lights 119 is operably engaged with the trough 121. In the illustrated embodiment, the set of brake lights 119 operably engaged with the trough 121 is used as the third brake light for the trailer 100.

Additionally, the trough 121 may define at least one slot 121G extending entirely through the trough 121 at the rear end 110B of the main body 110. The at least one slot 121G may be configured to convey rainwater "RW" or other forms of precipitation in liquid form from the top end 110E of the main body 110 towards an on-board drainage system, which is described in more detail below. In the illustrated embodiment, the trough 121 defines a first slot 121G1 and an adjacent second slot 121G2 positioned relative to a transverse axis of the trough 121.

In the illustrated embodiment, the main body 110 may be made of a first material, and the circumferential wall 112, the front bulkhead, the rear bulkhead 116, and the trough 121 may be made of a second, different material. As such, the main body 110 may be made from a metal material, specifically aluminum. Each of the circumferential wall 112, the front bulkhead, the rear bulkhead 116, and the trough 121 may be made from aluminum material. In other exemplary embodiments, any suitable metal material may be used to make a main body (and its associated components) for a trailer described and illustrated herein.

As illustrated in FIGS. 8-10, the drainage system may include a drainage portion or gutter 122 that is positioned exterior to the at least one interior chamber 117 of the main body 110 in which fluid or liquid is conveyed or drained outside of the interior chamber 117. The gutter 122 may be configured for draining fluid or liquid (such as rainwater) from the trough 121 to the rear end of the main body 110 at a distance away from the trailer 100. The gutter 122 is considered advantageous at least because the gutter 122 may prevent against unwanted stains or blemishes caused by precipitation dripping down the exposed rear bulkhead 116.

As illustrated in FIGS. 8-10, the gutter 122 may include a base plate 123. The base plate 123 may include a front end 123A that is operably engaged with the main body 110 proximate to the rear end 1106 and an opposing rear end 123B remote from the base plate 123. As shown in FIG. 9, the rear end 123B of the base plate 123 is defined at a distance "D" away from the rear bulkhead 116. Such distance "D" between the rear end 1236 of the base plate 123 and the rear bulkhead 116 allows for adequate distance in which accumulated precipitation may be drained away from the trailer 100 without creating unwanted stains or blemishes caused by precipitation dripping down the exposed rear bulkhead 116.

Referring to FIGS. 8 and 10, the base plate 123 may also define a curvilinear shape that extends from a left or first side 123C of the base plate to an opposing right or second side 123C of the base plate 123. The curvilinear shape of the base plate 123 provides ease of draining accumulated precipitation from trough 121 and away from the trailer 100, which is described in more detail below. The base plate 123 may also have a top surface 124 that extends between the left and right sides 122C, 122D and an opposing bottom surface that extends between the left and right sides 122C, 122D.

Referring to FIGS. 8-10, the gutter 122 may include at least one rail 128. The at least one rail 128 may be operably engaged with the top surface 124 of the base plate 123. The at least one rail 128 may also be aligned with the at least one slot 121G of the trough 121 in that the at least one rail 128 is configured to direct the flow of the accumulated precipitation from the trough 121 and away from the rear bulkhead 116 of the main body 110. In the illustrated embodiment, the gutter 122 includes a first rail 128A and a second rail 128B. Each of the first and second rails 128A, 128B may be operably engaged with the top surface 124 of the gutter 122 where the first and second rails 128A, 128B extend away from the top surface 124. In one exemplary embodiment, first and second rails of a gutter may be defined in the gutter 122 where the first and second rails extend into a top surface of the gutter towards a bottom surface of the gutter.

In the illustrated embodiment, the first rail 128A is aligned with the first slot 121G1 of the trough 121 to direct the flow of the accumulated precipitation from the trough 121 and away from the rear bulkhead 116 of the main body 110. Similarly, the second rail 128B is aligned with the second slot 121G2 of the trough 121 to direct the flow of the accumulated precipitation from the trough 121 and away from the rear bulkhead 116 of the main body 110. The first and second rails 128A, 128B are also offset from one another in that the first rail 128A directs a volume of accumulated precipitation towards the right side 123D of the base plate 123, and the second rail 128B directs another volume of accumulated precipitation towards the left side 123C of the base plate 123. Moreover, the first and second rails 128A, 128B may define a central passage 129 that increases in diameter from the front end 123A of the base plate 123 to the rear end 123B of the base plate 123.

Having now described the components of the trailer 100, specifically the trough 121 and the gutter 122, the method of use can now be discussed.

Upon towing, the trailer 100 and vehicle may incur different forms of precipitation during normal operation (e.g., rainwater, snow, sleet, ice, etc.). During this precipitation period, precipitation may contact the top end 110E of the main body 110 where precipitation may be accumulated inside the of the channel 121E of the trough 121. As shown in FIG. 10, precipitation, such as rainwater "RW", may fall from the surrounding atmosphere and interact with the trailer 100. As the rainwater "RW", or other liquid forms of precipitation, begin to accumulate in the trough 121, the trough 121 is adapted to convey the rainwater "RW" towards the first and second slots 121G1, 121G2 defined in the trough 121. As stated above, the process of draining accumulated precipitation from the trailer 100 will be focused on the rear portion the drainage system 120. It should be understood that this process of draining accumulated precipitation is substantially similar to a front gutter if equipped to a trailer such as trailer 100.

As illustrated in FIG. 10, the rainwater "RW" is conveyed from the chamber 118A of the trough 121 and into the first and second slots 121G1, 121G2. As the rainwater "RW" enters the first and second slots 121G1, 121G2, the rainwater "RW" moves laterally from the first and second slots 121G1, 121G2 towards gutter 122, specifically the first and second rails 128A, 128B. During this transition, the rainwater "RW" may move laterally away from or against the first and second rails 128A, 128B due to external forces placed on the rainwater "RW" (e.g., centrifugal force placed on the trailer 100 when turning with vehicle) or the flow rate of the rainwater "RW." In these specific cases, the rainwater "RW" may contact both the first and second rails 128A, 128B and be directed towards the rear end 123B of the base plate 123. Additionally, the curvilinear shape of the base plate 123 provides additional guidance to the rainwater "RW" by forcing the rainwater "RW" to move towards the first and second rails 128A, 128B. The structural configuration of the gutter 122 allows for rainwater "RW" or other types of precipitation to be funneled away from the trailer 100 at a desired distance to prevent unwanted stains or blemishes caused by precipitation dripping down the exposed rear bulkhead 116.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A trailer, comprising:
a main body having a front bulkhead, an opposing rear bulkhead, an exterior wall operably engaged with the front and rear bulkheads, and at least one interior chamber defined collectively by the front bulkhead, the rear bulkhead, and the exterior wall, said at least one interior chamber being adapted to carry a load, wherein the main body is formed of a first material; and
a removable false bulkhead operably engaged with the main body, said false bulkhead being located a distance away from one of the front bulkhead and the rear bulkhead and being formed of a second material different than the first material.

2. The trailer of claim 1, further comprising:
an extension portion operably engaged with the exterior wall; wherein the extension portion extends outwardly away from one of the front bulkhead and the rear bulkhead.

3. The trailer of claim 2, wherein the false bulkhead further comprises:
a base plate;
a circumferential lip extending laterally from the base plate towards the extension portion, wherein a portion of the circumferential lip is adapted to be operably engaged with the extension portion.

4. The trailer of claim 2, wherein the trailer further comprises:
at least one locking mechanism operably engaging the first false bulkhead with the extension portion, wherein the at least one locking mechanism is adapted to maintain the false bulkhead with the extension portion.

5. The trailer of claim 2, further comprising:
an exterior chamber defined between the false bulkhead and one of the front bulkhead and the rear bulkhead for concealing drainage of precipitation from a top end of the main body to a bottom end of the main body; wherein the exterior chamber is defined exterior to the interior chamber of the main body.

6. The trailer of claim 3, wherein the false bulkhead further comprises:
a plurality of apertures defined in the base plate, wherein each aperture of the plurality of apertures is adapted to receive and house an associated brake light of a plurality of brake lights to operably engage with the false bulkhead.

7. The trailer of claim 2, further comprising:
a first set of attachment openings defined in the extension portion;
a second set of attachment opening defined in a circumferential lip of the false bulkhead; and
a set of attachment mechanisms operably engaging the false bulkhead with the extension portion via the first and second set of attachment openings.

8. The trailer of claim 1, further comprising:
a bead of epoxy operably engaging the false bulkhead with the main body; wherein the bead of epoxy is adapted to prevent the escapement of precipitation being drained exterior to the interior chamber.

9. The trailer of claim 1, further comprising:
an opposing second extension portion operably engaged with the exterior wall; wherein the extension portion extends outwardly away from one of the front bulkhead and the rear bulkhead.

10. The trailer of claim 9, further comprising:
a removable second false bulkhead operably engaged with the second extension portion, said false bulkhead being located a second distance away from one of the front bulkhead and the rear bulkhead.

11. The trailer of claim 10, wherein the second false bulkhead:
a second exterior chamber defined between the second false bulkhead and one of the front bulkhead and the rear bulkhead for concealing drainage of precipitation from a top end of the main body to the bottom end of the main body; wherein the second exterior chamber is defined exterior to the interior chamber of the main body.

12. The trailer of claim 1, wherein the main body is made of aluminum; and wherein the removable false bulkhead is made of stainless steel.

13. The trailer of claim 1, wherein the main body is made of aluminum; and wherein the removable false bulkhead is made of a fabric material.

14. A trailer, comprising:
a main body having a front bulkhead, an opposing rear bulkhead, an exterior wall integral with the front and rear bulkheads such that the front bulkhead, the rear bulkhead, and the exterior wall form a single, monolithic unit, and at least one interior chamber defined collectively by the front bulkhead, the rear bulkhead, and the exterior wall, said at least one interior chamber being adapted to carry a load;
a removable false bulkhead operably engaged with the main body, said false bulkhead being located a distance away from one of the front bulkhead and the rear bulkhead and is free from being in communication with the at least one interior chamber and carrying the load; and
an extension portion operably engaged with the exterior wall; wherein the extension portion extends outwardly away from one of the front bulkhead and the rear bulkhead;
wherein the front bulkhead and the removable false bulkhead are each configured to interface with an exterior environment surrounding the main body while the rear bulkhead is protected from the exterior environment.

15. The trailer of claim 14, wherein the false bulkhead further comprises:
a base plate;
a circumferential lip extending laterally from the base plate towards the extension portion, wherein a portion of the circumferential lip is adapted to be operably engaged with the extension portion.

16. The trailer of claim 14, wherein the trailer further comprises:
at least one locking mechanism operably engaging the first false bulkhead with the extension portion, wherein the at least one locking mechanism is adapted to maintain the false bulkhead with the extension portion.

17. The trailer of claim 14, wherein the drainage system further comprises:
an exterior chamber defined between the false bulkhead and one of the front bulkhead and the rear bulkhead for concealing drainage of precipitation from a top end of the main body to a bottom end of the main body; wherein the exterior chamber is defined exterior to the interior chamber of the main body.

18. The trailer of claim 14, wherein the false bulkhead further comprises:
a plurality of apertures defined in the base plate, wherein each aperture of the plurality of apertures is adapted to receive and house an associated brake light of a plurality of brake lights to operably engage with the false bulkhead.

19. The trailer of claim 14, further comprising:
a first set of attachment openings defined in the extension portion;
a second set of attachment opening defined in a circumferential lip of the false bulkhead; and
a set of attachment mechanisms operably engaging the false bulkhead with the extension portion via the first and second set of attachment openings.

20. The trailer of claim 14, further comprising:
a bead of epoxy operably engaging the false bulkhead to the main body; wherein the bead of epoxy is adapted to prevent the escapement of precipitation being drained exterior to the interior chamber.

21. The trailer of claim 14, further comprising:
an opposing second extension portion operably engaged with the exterior wall; wherein the extension portion extends outwardly away from one of the front bulkhead and the rear bulkhead;
a removable second false bulkhead operably engaged with the second extension portion, said false bulkhead being located a second distance away from one of the front bulkhead and the rear bulkhead; and
a second exterior chamber defined between the second false bulkhead and one of the front bulkhead and the rear bulkhead for concealing drainage of precipitation from a top end of the main body to the bottom end of the main body; wherein the second exterior chamber is defined exterior to the interior chamber of the main body.

22. A trailer, comprising:
a main body having a front bulkhead, an opposing rear bulkhead, an exterior wall operably engaged with the front and rear bulkheads, and at least one interior chamber defined collectively by the front bulkhead, the rear bulkhead, and the exterior wall, said at least one interior chamber being adapted to carry a load;
a removable false bulkhead operably engaged with the main body, said false bulkhead being located a distance away from one of the front bulkhead and the rear bulkhead;
an extension portion operably engaged with the exterior wall; wherein the extension portion extends outwardly away from one of the front bulkhead and the rear bulkhead; and
an exterior chamber defined between the false bulkhead and one of the front bulkhead and the rear bulkhead for concealing drainage of precipitation from a top end of the main body to a bottom end of the main body; wherein the exterior chamber is defined exterior to the interior chamber of the main body.

* * * * *